United States Patent
Aoyama et al.

(10) Patent No.: US 10,578,192 B2
(45) Date of Patent: Mar. 3, 2020

(54) HYPOID GEAR DESIGN METHOD AND HYPOID GEAR

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Takayuki Aoyama, Nagoya (JP); Mizuho Inagaki, Aichi-gun (JP); Kiyokazu Sunami, Tajimi (JP); Sho Honda, Aichi-gun (JP); Yoshikatsu Shibata, Toyoake (JP); Hiromi Miyamura, Nagoya (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/980,464

(22) Filed: May 15, 2018

(65) Prior Publication Data
US 2018/0259038 A1 Sep. 13, 2018

Related U.S. Application Data

(62) Division of application No. 14/508,422, filed on Oct. 7, 2014, now abandoned, which is a division of
(Continued)

(30) Foreign Application Priority Data

Jul. 18, 2008 (JP) .................................. 2008-187965
Oct. 30, 2008 (JP) .................................. 2008-280558
May 1, 2009 (JP) .................................. 2009-111881

(51) Int. Cl.
F16H 55/08 (2006.01)
F16H 1/14 (2006.01)
F16H 57/00 (2012.01)

(52) U.S. Cl.
CPC .......... F16H 1/145 (2013.01); F16H 55/0853 (2013.01); F16H 2057/0087 (2013.01);
(Continued)

(58) Field of Classification Search
CPC .............. F16H 1/145; F16H 55/0853; F16H 2057/0087
(Continued)

(56) References Cited

U.S. PATENT DOCUMENTS 1,676,371 A 7/1928 Wildhaber
1,676,419 A 7/1928 Wildhaber
(Continued)

FOREIGN PATENT DOCUMENTS

EP 1 260 736 A1 11/2002
EP 1 870 690 A1 12/2007
(Continued)

OTHER PUBLICATIONS

Wildhaber et al., "Basic Relationship of Hypoid Gears," American Machinist, 1946, pp. 108-111.
(Continued)

Primary Examiner — William C Joyce
(74) Attorney, Agent, or Firm — Oliff PLC

(57) ABSTRACT

A degree of freedom of a hypoid gear is improved. An instantaneous axis in a relative rotation of a gear axis and a pinion axis, a line of centers, an intersection between the instantaneous axis and the line of centers, and an inclination angle of the instantaneous axis with respect to the rotation axis of the gear are calculated based on a shaft angle, an offset, and a gear ratio of a hypoid gear. Based on these
(Continued)

variables, base coordinate systems are determined, and the specifications are calculated using these coordinate systems. For the spiral angles, pitch cone angles, and reference circle radii of the gear and pinion, one of the values for the gear and the pinion is set and a design reference point is calculated. Based on the design reference point and a contact normal of the gear, specifications are calculated. The pitch cone angle of the gear or the pinion can be freely selected.

4 Claims, 26 Drawing Sheets

Related U.S. Application Data application No. 13/054,323, filed as application No. PCT/JP2009/063234 on Jul. 16, 2009, now Pat. No. 8,881,401.

(52) U.S. Cl.
CPC .... *Y10T 29/49462* (2015.01); *Y10T 29/49467* (2015.01); *Y10T 29/49476* (2015.01); *Y10T 74/1987* (2015.01); *Y10T 74/19665* (2015.01)

(58) Field of Classification Search
USPC .................................. 74/459.5, 462
See application file for complete search history.

(56) References Cited

U.S. PATENT DOCUMENTS

| | | | |
|---|---|---|---|
| 2,506,756 | A | 5/1950 | Wildhaber |
| 2,930,248 | A | 3/1960 | Wildhaber |
| 7,761,554 | B1 | 7/2010 | Hild et al. |
| 2003/0056371 | A1 | 3/2003 | Honda |
| 2006/0090340 | A1 | 5/2006 | Fleytman |

FOREIGN PATENT DOCUMENTS

| | | |
|---|---|---|
| JP | A09053702 | 2/1997 |
| JP | B23484879 | 1/2004 |
| WO | 01/65148 A1 | 9/2001 |

OTHER PUBLICATIONS

Wildhaber et al., "Basic Relationship of Hypoid Gears . . . II," American Machinist, 1946, pp. 131-134.
Ito et al., "Equi-Depth Tooth Hypoid Gear Using Formate Gear Cutting Method (1st Report, Basic Dimensions for Gear Cutting)," The Japan Society of Mechanical Engineers, 1995, pp. 373-379 (with partial translation and abstract).
International Search Report issued in International Application No. PCT/JP2009/063234 dated Nov. 18, 2009.
Written Opinion of the International Searching Authority issued in International Application No. PCT/JP2009/063234 dated Nov. 18, 2009.
Ex Parte Mewherter (Appeal 2012-007692).

1

HYPOID GEAR DESIGN METHOD AND HYPOID GEAR

The present application is a divisional application of U.S. application Ser. No. 14/508,422, filed on Oct. 7, 2014, which is a divisional application of U.S. application Ser. No. 13/054,323, filed Feb. 3, 2011, which is a National Stage Entry of PCT/JP2009/063234, filed Jul. 16, 2009, which claims priority to each of JP 2009-111881, filed May 1, 2009, JP 2008-280558, filed Oct. 30, 2008, and JP 2008-187965, filed Jul. 18, 2008. The disclosures of each of the above applications are hereby incorporated by reference in their entireties.

TECHNICAL FIELD

The present invention relates to a method of designing a hypoid gear.

BACKGROUND ART

A design method of a hypoid gear is described in Ernest Wildhaber, Basic Relationship of Hypoid Gears, American Machinist, USA, Feb. 14, 1946, p. 108-111 and in Ernest Wildhaber, Basic Relationship of Hypoid Gears II, American Machinist, USA, Feb. 28, 1946, p. 131-134. In these references, a system of eight equations is set and solved (for cone specifications that contact each other) by setting a spiral angle of a pinion and an equation of a radius of curvature of a tooth trace, in order to solve seven equations with nine variables which are obtained by setting, as design conditions, a shaft angle, an offset, a number of teeth, and a ring gear radius. Because of this, the cone specifications such as the pitch cone angle $\Gamma_{gw}$ depend on the radius of curvature of the tooth trace, and cannot be arbitrarily determined.

In addition, in the theory of gears in the related art, a tooth trace is defined as "an intersection between a tooth surface and a pitch surface". However, in the theory of the related art, there is no common geometric definition of a pitch surface for all kinds of gears. Therefore, there is no common definition of the tooth trace and of contact ratio of the tooth trace for various gears from cylindrical gears to hypoid gears. In particular, in gears other than the cylindrical gear and a bevel gear, the tooth trace is not clear.

In the related art, the contact ratio $m_f$ of tooth trace is defined by the following equation for all gears.

$$m_f = F \tan \psi_0 / p$$

where, p represents the circular pitch, F represents an effective face width, and $\psi_0$ represents a spiral angle.

Table 1 shows an example calculation of a hypoid gear according to the Gleason method. As shown in this example, in the Gleason design method, the tooth trace contact ratios are equal for a drive-side tooth surface and for a coast-side tooth surface. This can be expected because of the calculation of the spiral angle $\psi_0$ as a virtual spiral bevel gear with $\psi_0 = (\psi_{pw} + \psi_{gw})/2$ (refer to FIG. 9).

The present inventors, on the other hand, proposed in Japanese Patent No. 3484879 a method for uniformly describing the tooth surface of a pair of gears. In other word, a method for describing a tooth surface has been shown which can uniformly be used in various situations from a pair of gears having parallel axes, which is the most widely used configuration, to a pair of gears whose axes do not intersect and are not parallel with each other (skew position).

There is a desire to determine the cone specifications independent from the radius of curvature of the tooth trace, and to increase the degree of freedom of the design.

In addition, in a hypoid gear, the contact ratio and the transmission error based on the calculation method of the related art are not necessarily correlated to each other. Of the contact ratios of the related art, the tooth trace contact ratio has the same value between the drive-side and the coast-side, and thus the theoretical basis is brought into question.

An advantage of the present invention is that a hypoid gear design method is provided which uses the uniform describing method of the tooth surface described in JP 3484879, and which has a high degree of freedom of design.

Another advantage of the present invention is that a hypoid gear design method is provided in which a design reference body of revolution (pitch surface) which can be applied to the hypoid gear, the tooth trace, and the tooth trace contact ratio are newly defined using the uniform describing method of the tooth surface described in JP 3484879, and the newly defined tooth trace contact ratio is set as a design index.

SUMMARY OF THE INVENTION

According to one aspect of the present invention, there is provided a design method of a hypoid gear wherein an instantaneous axis S which is an axis of a relative angular velocity of a first gear and a second gear, a line of centers $v_c$ which is common to rotation axes of the first gear and the second gear, an intersection $C_s$ between the instantaneous axis S and the line of centers $v_c$, and an inclination angle $\Gamma_s$ of the instantaneous axis S with respect to the rotation axis of the second gear are calculated based on a shaft angle $\Sigma$, an offset E, and a gear ratio $i_o$ of a hypoid gear, basic coordinate systems $C_1$, $C_2$, and $C_s$ are determined from these variables, and specifications are calculated based on the coordinate systems. In particular, the specifications are calculated by setting a common point of contact of pitch cones of the first gear and the second gear as a design reference point $P_w$.

When an arbitrary point (design reference point) $P_w$ is set in a static space, six cone specifications which are in contact at the point $P_w$ are represented by coordinates ($u_{cw}$, $v_{cw}$, $z_{cw}$) of the point $P_w$ based on a plane (pitch plane) $S_t$ defined by a peripheral velocity $V_{1w}$ and a peripheral velocity $V_{2w}$ at the point $P_w$ and a relative velocity $V_{rsw}$. Here, the cone specifications refer to reference circle radii $R_{1w}$ and $R_{2w}$ of the first gear and the second gear, spiral angles $\psi_{pw}$ and $\psi_{gw}$ of the first gear and the second gear, and pitch cone angles $\gamma_{pw}$ and $\Gamma_{gw}$ of the first gear and the second gear. When three of these cone specifications are set, the point $P_w$ is set, and thus the remaining three variables are also set. In other words, in various aspects of the present invention, the specifications of cones which contact each other are determined based merely on the position of the point $P_w$ regardless of the radius of curvature of the tooth trace.

Therefore, it is possible to set a predetermined performance as a design target function, and select the cone specifications which satisfy the target function with a high degree of freedom. Examples of the design target function include, for example, a sliding speed of the tooth surface, strength of the tooth, and the contact ratio. The performance related to the design target function is calculated while the cone specification, for example the pitch cone angle $\Gamma_{gw}$, is changed, and the cone specification is changed and a suitable value is selected which satisfies the design request.

According to one aspect of the present invention, an contact ratio is employed as the design target function, and there is provided a method of designing a hypoid gear wherein a pitch cone angle $\Gamma_{gcone}$ of one gear is set, an contact ratio is calculated, the pitch cone angle $\Gamma_{gcone}$ is changed so that the contact ratio becomes a predetermined value, a pitch cone angle $\Gamma_{gw}$ is determined, and specifications are calculated based on the determined pitch cone angle $\Gamma_{gw}$. As described above, the contact ratio calculated by the method of the related art does not have a theoretical basis. In this aspect of the present invention, a newly defined tooth trace and an contact ratio related to the tooth trace are calculated, to determine the pitch cone angle. The tooth surface around a point of contact is approximated by its tangential plane, and a path of contact is made coincident to an intersection of the surface of action (pitch generating line $L_{pw}$), and a tooth trace is defined as a curve on a pitch hyperboloid obtained by transforming the path of contact into a coordinate system which rotates with each gear. Based on the tooth trace of this new definition, the original contact ratio of the hypoid gear is calculated and the contact ratio can be used as an index for design. A characteristic of the present invention is in the definition of the pitch cone angle related to the newly defined tooth trace.

According to another aspect of the present invention, it is preferable that, in the hypoid gear design method, the tooth trace contact ratio is assumed to be 2.0 or more in order to achieve constant engagement of two gears with two or more teeth.

When the pitch cone angle $\Gamma_{gw}$ is set to an inclination angle $\Gamma_s$ of an instantaneous axis, the contact ratios of the drive-side and the coast-side can be set approximately equal to each other. Therefore, it is preferable for the pitch cone angle to be set near the inclination angle of the instantaneous axis. In addition, it is also preferable to increase one of the contact ratios of the drive-side or coast-side as required. In this process, first, the pitch cone angle is set at the inclination angle of the instantaneous axis and the contact ratio is calculated, and a suitable value is selected by changing the pitch cone angle while observing the contact ratio. It is preferable that a width of the change of the pitch cone angle be in a range of ±5° with respect to the inclination angle $\Gamma_s$ of the instantaneous axis. This is because if the change is out of this range, the contact ratio of one of the drive-side and the coast-side will be significantly reduced.

More specifically, according to one aspect of the present invention, a hypoid gear is designed according to the following steps:

(a) setting a shaft angle $\Sigma$, an offset E, and a gear ratio $i_0$ of a hypoid gear;

(b) calculating, based on the shaft angle $\Sigma$, the offset E, and the gear ratio $i_0$, an instantaneous axis S which is an axis of a relative angular velocity of a first gear and a second gear, a line of centers $v_c$ with respect to rotation axes of the first gear and the second gear, an intersection $C_s$ between the instantaneous axis S and the line of centers $v_c$, and an inclination angle $\Gamma_s$ of the instantaneous axis S with respect to the rotation axis of the second gear, and determining coordinate systems $C_1$, $C_2$, and $C_s$ for calculation of specifications;

(c) setting three variables including one of a reference circle radius $R_{1w}$ of the first gear and a reference circle radius $R_{2w}$ of the second gear, one of a spiral angle $\psi_{pw}$ of the first gear and a spiral angle $\psi_{gw}$ of the second gear, and one of a pitch cone angle $\gamma_{pw}$ of the first gear and a pitch cone angle $\Gamma_{gw}$ of the second gear;

(d) calculating the design reference point $P_w$, which is a common point of contact of pitch cones of the first gear and the second gear, and the three other variables which are not set in the step (c), based on the three variables which are set in the step (c);

(e) setting a contact normal $g_{wD}$ of a drive-side tooth surface of the second gear;

(f) setting a contact normal $g_{wC}$ of a coast-side tooth surface of the second gear; and (g) calculating specifications of the hypoid gear based on the design reference point $P_w$, the three variables which are set in the step (c), the contact normal $g_{wD}$ of the drive-side tooth surface of the second gear, and the contact normal $g_{wC}$ of the coast-side tooth surface of the second gear.

According to another aspect of the present invention, a hypoid gear is designed according to the following steps:

(a) setting a shaft angle $\Sigma$, an offset E, and a gear ratio $i_0$ of a hypoid gear;

(b) calculating, based on the shaft angle $\Sigma$, the offset E, and the gear ratio $i_0$, an instantaneous axis S which is an axis of a relative angular velocity of a first gear and a second gear, a line of centers $v_c$ with respect to rotation axes of the first gear and the second gear, an intersection $C_s$ between the instantaneous axis S and the line of centers $v_c$, and an inclination angle $\Gamma_s$ of the instantaneous axis S with respect to the rotation axis of the second gear, and determining coordinate systems $C_1$, $C_2$, and $C_s$ for calculation of specifications;

(c) setting three variables including one of a reference circle radius $R_{1W}$ of the first gear and a reference circle radius $R_{2w}$ of the second gear, one of a spiral angle $\psi_{pw}$ of the first gear and a spiral angle $\psi_{gw}$ of the second gear, and one of a pitch cone angle $\gamma_{pw}$ of the first gear and a pitch cone angle $\Gamma_{gw}$ of the second gear;

(d) calculating the design reference point $P_w$, which is a common point of contact of pitch cones of the first gear and the second gear, and the three other variables which are not set in the step (c), based on the three variable which are set in the step (c);

(e) calculating a pitch generating line $L_{pw}$ which passes through the design reference point $P_w$ and which is parallel to the instantaneous axis S;

(f) setting an internal circle radius $R_{2t}$ and an external circle radius $R_{2h}$ of the second gear;

(g) setting a contact normal $g_{wD}$ of a drive-side tooth surface of the second gear;

(h) calculating an intersection $P_{OD}$ between a reference plane $S_H$ which is a plane orthogonal to the line of centers $v_c$ and passing through the intersection $C_s$ and the contact normal $g_{wD}$ and a radius $R_{20D}$ of the intersection $P_{OD}$ around a gear axis;

(i) calculating an inclination angle $\varphi_{sOD}$ of a surface of action $S_{wD}$ which is a plane defined by the pitch generating line $L_{pw}$ and the contact normal $g_{wD}$ with respect to the line of centers $v_c$, an inclination angle $\psi_{swOD}$ of the contact normal $g_{wD}$ on the surface of action $S_{wD}$ with respect to the instantaneous axis S, and one pitch $P_{gwD}$ on the contact normal $g_{wD}$;

(j) setting a provisional second gear pitch cone angle $\Gamma_{gcone}$, and calculating an contact ratio $m_{fconeD}$ of the drive-side tooth surface based on the internal circle radius $R_{2t}$ and the external circle radius $R_{2h}$;

(k) setting a contact normal $g_{wC}$ of a coast-side tooth surface of the second gear;

(l) calculating an intersection $P_{OC}$ between the reference plane $S_H$ which is a plane orthogonal to the line of centers $v_c$ and passing through the intersection $C_s$ and the contact normal $g_{wC}$ and a radius $R_{20c}$ of the intersection $P_{OC}$ around the gear axis;

(m) calculating an inclination angle $\phi_{sOC}$ of a surface of action $S_{wC}$ which is a plane defined by the pitch generating line $L_{pw}$ and the contact normal $g_{wC}$ with respect to the line of centers $v_c$, an inclination angle $\psi_{swOC}$ of the contact normal $g_{wC}$ on the surface of action $S_{wC}$ with respect to the instantaneous axis S, and one pitch $P_{gwC}$ on the contact normal $g_{wC}$;

(n) setting a provisional second gear pitch cone angle $\Gamma_{gcone}$, and calculating an contact ratio $m_{fconeC}$ of the coast-side tooth surface based on the internal circle radius $R_{2t}$ and the external circle radius $R_{2h}$;

(o) comparing the contact ratio $m_{fconeD}$ of the drive-side tooth surface and the contact ratio $m_{fconeC}$ of the coast-side tooth surface, and determining whether or not these contact ratios are predetermined values;

(p) when the contact ratios of the drive-side and the coast-side are the predetermined values, replacing the provisional second gear pitch cone angle $\Gamma_{gcone}$ with the second gear pitch cone angle $\Gamma_{gw}$ obtained in the step (c) or in the step (d);

(q) when the contact ratios of the drive-side and the coast-side are not the predetermined values, changing the provisional second gear pitch cone angle $\Gamma_{gcone}$ and re-executing from step (g);

(r) re-determining the design reference point $P_w$, the other one of the reference circle radius $R_{1w}$ of the first gear and the reference circle radius $R_{2w}$ of the second gear which is not set in the step (c), the other one of the spiral angle $\psi_{pw}$ of the first gear and the spiral angle $\psi_{gw}$ of the second gear which is not set in the step (c), and the first gear pitch cone angle $\gamma_{pw}$ based on the one of the reference circle radius $R_{1w}$ of the first gear and the reference circle radius $R_{2w}$ of the second gear which is set in the step (c), the one of the spiral angle $\psi_{pw}$ of the first gear and the spiral angle $\psi_{gw}$ of the second gear which is set in the step (c), and the second gear pitch cone angle $\Gamma_{gw}$ which is replaced in the step (p), and (s) calculating specifications of the hypoid gear based on the specifications which are set in the step (c), the specifications which are re-determined in the step (r), the contact normal $g_{wD}$ of the drive-side tooth surface of the second gear, and the contact normal $g_{wC}$ of the coast-side tooth surface of the second gear.

According to another aspect of the present invention, a hypoid gear is designed according to the following steps:

(a) setting a shaft angle $\Sigma$, an offset E, and a gear ratio $i_0$ of a hypoid gear;

(b) calculating, based on the shaft angle $\Sigma$, the offset E, and the gear ratio $i_0$, an instantaneous axis S which is an axis of a relative angular velocity of a first gear and a second gear, a line of centers $v_c$ with respect to rotation axes of the first gear and the second gear, an intersection $C_s$ between the instantaneous axis S and the line of centers $v_c$, and an inclination angle $\Gamma_s$ of the instantaneous axis S with respect to the rotation axis of the second gear, to determine coordinate systems $C_1$, $C_2$, and $C_s$ for calculation of specifications;

(c) setting three variables including one of a reference circle radius $R_{1w}$ of the first gear and a reference circle radius $R_{2w}$ of the second gear, one of a spiral angle $\psi_{pw}$ of the first gear and a spiral angle $\psi_{gw}$ of the second gear, and one of a pitch cone angle $\gamma_{pw}$ of the first gear and a pitch cone angle $\Gamma_{gw}$ of the second gear;

(d) calculating the design reference point $P_w$, which is a common point of contact of pitch cones of the first gear and the second gear, and the three other variables which are not set in the step (c), based on the three variables which are set in the step (c);

(e) calculating a pitch generating line $L_{pw}$ which passes through the design reference point $P_w$ and which is parallel to the instantaneous axis S;

(f) setting an internal circle radius $R_{2t}$ and an external circle radius $R_{2h}$ of the second gear;

(g) setting a contact normal $g_{wD}$ of a drive-side tooth surface of the second gear;

(h) calculating an intersection $P_{OD}$ between a reference plane $S_H$ which is a plane orthogonal to the line of centers $v_c$ and passing through the intersection $C_s$ and the contact normal $g_{wD}$ and a radius $R_{20D}$ of the intersection $P_{OD}$ around a gear axis;

(i) calculating an inclination angle $\phi_{sOD}$ of a surface of action $S_{wD}$ which is a plane defined by the pitch generating line $L_{pw}$ and the contact normal $g_{wD}$ with respect to the line of centers $v_c$, an inclination angle $\psi_{swOD}$ of the contact normal $g_{wD}$ on the surface of action $S_{wD}$ with respect to the instantaneous axis S, and one pitch $P_{gWD}$ on the contact normal $g_{wD}$;

(j) setting a provisional second gear pitch cone angle $\Gamma_{gcone}$, and calculating an contact ratio $m_{fconeD}$ of the drive-side tooth surface based on the internal circle radius $R_{2t}$ and the external circle radius $R_{2h}$;

(k) setting a contact normal $g_{wC}$ of a coast-side tooth surface of the second gear;

(l) calculating an intersection $P_{OC}$ between the reference plane $S_H$ which is a plane orthogonal to the line of centers $v_c$ and passing through the intersection $C_s$ and the contact normal $g_{wC}$ and a radius $R_{20c}$ of the intersection $P_{OC}$ around the gear axis;

(m) calculating an inclination angle $\phi_{sOC}$ of a surface of action $S_{wC}$ which is a plane defined by the pitch generating line $L_{pw}$ and the contact normal $g_{wC}$ with respect to the line of centers $v_c$, an inclination angle $\psi_{swOC}$ of the contact normal $g_{wC}$ on the surface of action $S_{wC}$ with respect to the instantaneous axis S, and one pitch $P_{gwC}$ on the contact normal $g_{wC}$;

(n) setting a provisional second gear pitch cone angle $\Gamma_{gcone}$, and calculating an contact ratio $m_{fconeC}$ of the coast-side tooth surface based on the internal circle radius $R_{2t}$ and the external circle radius $R_{2h}$;

(o) comparing the contact ratio $m_{fconeD}$ of the drive-side tooth surface and the contact ratio $m_{fconeC}$ of the coast-side tooth surface, and determining whether or not these contact ratios are predetermined values;

(p) changing, when the contact ratios of the drive-side and the coast-side are not the predetermined values, the provisional second gear pitch cone angle $\Gamma_{gcone}$ and re-executing from step (g);

(q) defining, when the contact ratios of the drive-side and the coast-side are the predetermined values, a virtual cone having the provisional second gear pitch cone angle $\Gamma_{gcone}$ as a cone angle;

(r) calculating a provisional pitch cone angle $\gamma_{pcone}$ of the virtual cone of the first gear based on the determined pitch cone angle $\Gamma_{gcone}$; and (s) calculating specifications of the hypoid gear based on the design reference point $P_w$, the reference circle radius $R_{1w}$ of the first gear and the reference circle radius $R_{2w}$ of the second gear which are set in the step (c) and the step (d), the spiral angle $\psi_{pw}$ of the first gear and the spiral angle $\psi_{gw}$ of the second gear which are set in the step (c) and the step (d), the cone angle $\Gamma_{gcone}$ of the virtual cone and the cone angle $\gamma_{pcone}$ of the virtual cone which are defined in the step (q) and the step (r), the contact normal $g_{wD}$ of the drive-side tooth surface of the second gear, and the contact normal $g_{wC}$ of the coast-side tooth surface of the second gear.

According to another aspect of the present invention, in a method of designing a hypoid gear, a pitch cone angle of one gear is set equal to an inclination angle of an instantaneous axis, and the specifications are calculated. When the pitch cone angle is set equal to the inclination angle of the instantaneous axis, the contact ratios of the drive-side tooth surface and the coast-side tooth surface become almost equal to each other. Therefore, a method is provided in which the pitch cone angle is set to the inclination angle of the instantaneous axis in a simple method, that is, without reviewing the contact ratios in detail.

More specifically, according to another aspect of the present invention, the hypoid gear is designed according to the following steps:

(a) setting a shaft angle $\Sigma$, an offset E, and a gear ratio $i_0$ of a hypoid gear;

(b) calculating, based on the shaft angle $\Sigma$, the offset E, and the gear ratio $i_0$, an instantaneous axis S which is an axis of a relative angular velocity of a first gear and a second gear, a line of centers $v_c$ with respect to rotational axes of the first gear and the second gear, an intersection $C_s$ between the instantaneous axis S and the line of centers $v_c$, and an inclination angle $\Gamma_s$ of the instantaneous axis with respect to the rotational axis of the second gear;

(c) determining the inclination angle $\Gamma_s$ of the instantaneous axis as a second gear pitch cone angle $\Gamma_{gw}$; and (d) calculating specifications of the hypoid gear based on the determined second gear pitch cone angle $\Gamma_{gw}$.

According to another aspect of the present invention, in a method of designing a hypoid gear, a design reference point $P_w$ is not set as a point of contact between the pitch cones of the first gear and second gear, but is determined based on one of reference circle radii $R_{1w}$ and $R_{2w}$ of the first gear and the second gear, a spiral angle $\psi_{rw}$, and a phase angle $\beta_w$ of the design reference point, and the specifications are calculated.

More specifically, according to another aspect of the present invention, a hypoid gear is designed according to the following steps:

(a) setting a shaft angle $\Sigma$, an offset E, and a gear ratio $i_0$ of a hypoid gear;

(b) calculating, based on the shaft angle $\Sigma$, the offset E, and the gear ratio $i_0$, an instantaneous axis S which is an axis of a relative angular velocity of a first gear and a second gear, a line of centers $v_c$ with respect to rotation axes of the first gear and the second gear, an intersection $C_s$ between the instantaneous axis S and the line of centers $v_c$, and an inclination angle $\Gamma_s$ of the instantaneous axis S with respect to the rotation axis of the second gear, to determine coordinate systems $C_1$, $C_2$, and $C_s$ for calculation of specifications;

(c) setting one of a reference circle radius $R_{1w}$ of the first gear and a reference circle radius $R_{2w}$ of the second gear, a spiral angle $\psi_{rw}$, and a phase angle $\beta_w$ of a design reference point $P_w$, to determine the design reference point;

(d) calculating the design reference point $P_w$ and a reference circle radius which is not set in the step (c) from a condition where the first gear and the second gear share the design reference point $P_w$, based on the three variables which are set in the step (c);

(e) setting one of a reference cone angle $\gamma_{pw}$ of the first gear and a reference cone angle $\Gamma_{gw}$ of the second gear;

(f) calculating a reference cone angle which is not set in the step (e), based on the shaft angle $\Sigma$ and the reference cone angle which is set in the step (e);

(g) setting a contact normal $g_{wD}$ of a drive-side tooth surface of the second gear;

(h) setting a contact normal $g_{wC}$ of a coast-side tooth surface of the second gear; and (i) calculating specifications of the hypoid gear based on the design reference point $P_w$, the reference circle radii $R_{1w}$ and $R_{2w}$, and the spiral angle $\psi_{rw}$, which are set in the step (c) and the step (d), the reference cone angles $\gamma_{pw}$ and $\Gamma_{gw}$ which are set in the step (e) and the step (f), and the contact normals $g_{wC}$ and $g_{wD}$ which are set in the step (g) and the step (h).

The designing steps of these two aspects of the present invention can be executed by a computer by describing the steps with a predetermined computer program. A unit which receives the gear specifications and variables is connected to the computer and a unit which provides a design result or a calculation result at an intermediate stage is also connected to the computer.

DESCRIPTION OF THE PREFERRED EMBODIMENT

A preferred embodiment of the present invention will now be described with reference to the drawings.

Figure 1A:
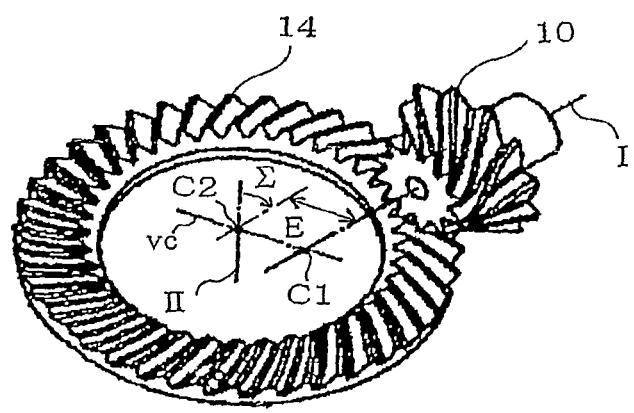
FIG. 1A is a diagram showing external appearance of a hypoid gear.
Figure 1B:
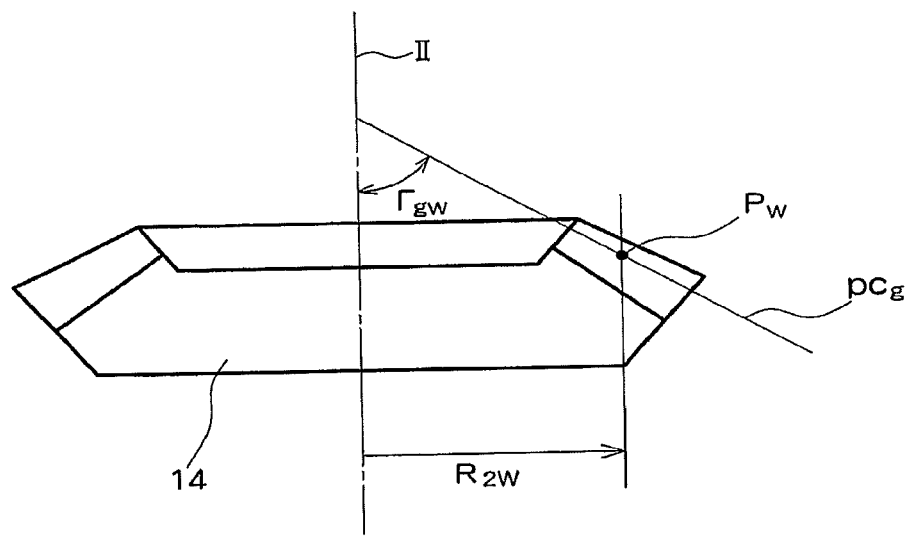
FIG. 1B is a diagram showing a cross sectional shape of a gear.
Figure 1C:
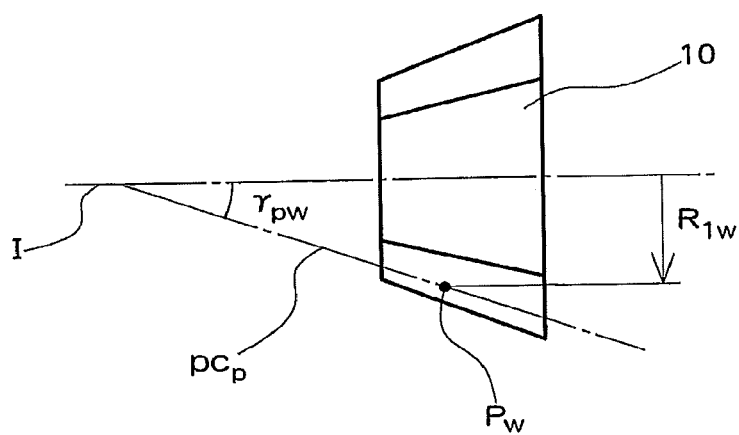
FIG. 1C is a diagram showing a cross sectional shape of a pinion.

1. Coordinate System of Hypoid Gear 1.1 Coordinate Systems $C_1$, $C_2$, $C_{q1}$, and $C_{q2}$ In the following description, a small diameter gear in a pair of hypoid gears is referred to as a pinion, and a large diameter gear is referred to as a ring gear. In addition, in the following, the descriptions may be based on the tooth surface, tooth trace, etc. of the ring gear, but because the pinion and the ring gear are basically equivalent, the description may similarly be based on the pinion. FIG. 1A is a perspective view showing external appearance of a hypoid gear. The hypoid gear is a pair of gears in which a rotational axis (pinion axis) I of the pinion 10 and the rotational axis (gear axis) II of the ring gear 14 are not parallel and do not intersect. A line of centers $v_c$ of the pinion axis and the gear axis exists, and a distance (offset) between the two axes on the line of centers $v_c$ is set as E, an angle (shaft angle) between the pinion axis and the gear axis projected onto a plane orthogonal to the line of centers $v_c$ is set as $\Sigma$, and a gear ratio is set as $i_0$. FIG. 1B is a cross sectional diagram at a plane including the axis II of the ring gear 14. An angle between a pitch cone element $pc_g$ passing at a design reference point $P_w$, to be described later, and the axis II is shown as a pitch cone angle $\Gamma_{gw}$. A distance between the design reference point $P_w$ and the axis II is shown as a reference circle radius $R_{2w}$. FIG. 1C is a cross sectional diagram at a plane including the axis I of the pinion 10. An angle between a pitch cone element $pc_p$ passing at the design reference point $P_w$ and the axis I is shown as a pitch cone angle $\gamma_{pw}$. In addition, a distance between the design reference point $P_w$ and the axis I is shown as a reference circle radius $R_{1w}$.

Figure 2:
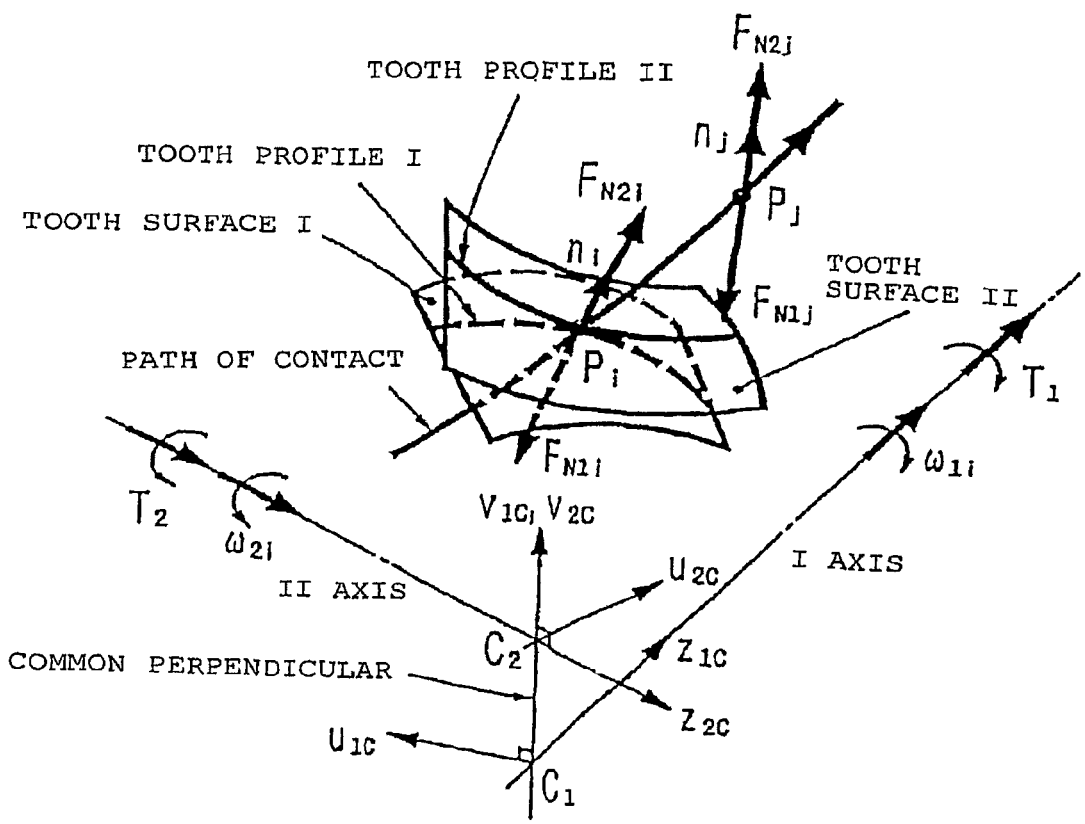
FIG. 2 is a diagram schematically showing appearance of coordinate axes in each coordinate system, a tooth surface of a gear, a tooth profile, and a path of contact.

FIG. 2 shows coordinate systems $C_1$ and $C_2$. A direction of the line of centers $v_c$ is set to a direction in which the direction of an outer product $\omega_{2i} \times \omega_{1i}$ of angular velocities $\omega_{1i}$ and $\omega_{2i}$ of the pinion gear axis I and the ring gear axis II is positive. The intersection points of the pinion and ring gear axes I, II and the line of centers $v_c$ are designated by $C_1$ and $C_2$ and a situation where $C_2$ is above $C_1$ with respect to the line of centers $v_c$ will be considered in the following. A case where $C_2$ is below $C_1$ would be very similar. A distance between $C_1$ and $C_2$ is the offset E. A coordinate system $C_2$ of a ring gear 14 is defined in the following manner. The origin of the coordinate system $C_2$ ($u_{2c}$, $v_{2c}$, $z_{2c}$) is set at $C_2$, a $z_{2c}$ axis of the coordinate system $C_2$ is set to extend in the $\omega_{20}$ direction on the ring gear axis II, a $v_{2c}$ axis of the coordinate system $C_2$ is set in the same direction as that of the line of centers $v_c$, and a $u_{2c}$ axis of the coordinate system $C_2$ is set to be normal to both the axes to form a right-handed coordinate system. A coordinate system $C_1$ ($u_{1c}$, $v_{1c}$, $z_{1c}$) can be defined in a very similar manner for the pinion 10.

Figure 3:
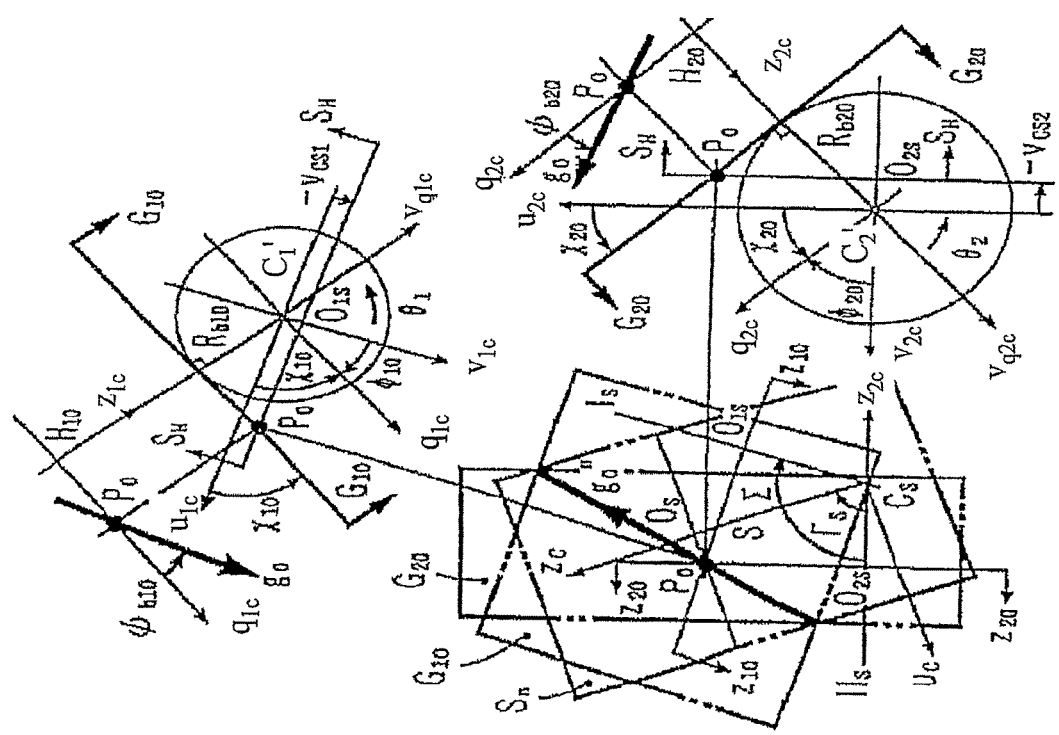
FIG. 3 is a diagram showing a design reference point $P_0$ and a path of contact $g_0$ for explaining a variable determining method, with coordinate systems $C_2'$, $O_{q2}$, $C_1'$, and $O_{q1}$.

FIG. 3 shows a relationship between the coordinate systems $C_1$, $C_2$, $C_{q1}$, and $C_{q2}$ in gears I and II. The coordinate systems $C_2$ and $C_{q2}$ of the gear II are defined in the following manner. The origin of the coordinate system $C_2$ ($u_{2c}$, $v_{2c}$, $z_{2c}$) is set at $C_2$, a $z_{2c}$ axis of the coordinate system $C_2$ is set to extend in the $\omega_{20}$ direction on the ring gear axis II, a $v_{2c}$ axis of the coordinate system $C_2$ is set in the same direction as that of the line of centers $v_c$, and a $u_{2c}$ axis of the coordinate system $C_2$ is set to be normal to both the axes to form a right-handed coordinate system. The coordinate system $C_{q2}$ ($q_{2c}$, $v_{q2c}$, $z_{2c}$) has the origin $C_2$ and the $z_{2c}$ axis in common, and is a coordinate system formed by the rotation of the coordinate system $C_2$ around the $z_{2c}$ axis as a rotational axis by $\chi_{20}$ (the direction shown in the figure is positive) such that the plane $v_{2c}=0$ is parallel to the plane of action $G_{20}$. The $u_{2c}$ axis becomes a $q_{2c}$ axis, and the $v_{2c}$ axis becomes a $v_{q2c}$ axis.

The plane of action $G_{20}$ is expressed by $v_{q2c}=-R_{b2}$ using the coordinate system $C_{q2}$. In the coordinate system $C_2$, the inclination angle of the plane of action $G_{20}$ to the plane $v_{2c}=0$ is the angle $\chi_{20}$, and the plane of action $G_{20}$ is a plane tangent to the base cylinder (radius $R_{b20}$).

The relationships between the coordinate systems $C_2$ and $C_{q2}$ become as follows because the $z_{2c}$ axis is common.

$u_{2c} = q_{2c} \cos \chi_{20} - v_{q2c} \sin \chi_{20}$ $v_{2c} = q_{2c} \sin \chi_{20} + v_{q2c} \cos \chi_{20}$ Because the plane of action $G_{20}$ meets $v_{q2c}=-R_{b20}$, the following expressions (1), are satisfied if the plane of action $G_{20}$ is expressed by the radius $R_{b20}$ of the base cylinder.

$u_{2c} = q_{2c} \cos \chi_{20} + R_{b20} \sin \chi_{20}$ $v_{2c} = q_{2c} \sin \chi_{20} - R_{b20} \cos \chi_{20}$ $z_{2c} = z_{2c}$ \hfill (1)

If the line of centers $g_0$ is defined to be on the plane of action $G_{20}$ and also defined such that the line of centers $g_0$ is directed in the direction in which the $q_{2c}$ axis component is positive, an inclination angle of the line of centers $g_0$ from the $q_{2c}$ axis can be expressed by $\psi_{b20}$ (the direction shown in the figure is positive). Accordingly, the inclination angle of the line of centers $g_0$ in the coordinate system $C_2$ is defined to be expressed in the form of $g_0$ ($\varphi_{20}$, $\psi_{b20}$) with the inclination angle $\varphi_{20}$ (the complementary angle of the $\chi_{20}$) of the plane of action $G_{20}$ with respect to the line of centers $v_c$, and $\psi_{b2}$.

As for the gear I, coordinate systems $C_1$ ($u_{1c}$, $v_{1c}$, $z_{1c}$) and $C_{q1}$ ($q_{1C}$, $v_{q1c}$, $z_{1c}$), a plane of action $G_{10}$, a radius $R_{b1}$ of the base cylinder, and the inclination angle $g_0$ ($\varphi_{10}$, $\psi_{b10}$) of the line of centers $g_0$ can be similarly defined. Because the systems share a common $z_{1c}$ axis, the relationship between the coordinate systems $C_1$ and $C_{q1}$ can also be expressed by the following expressions (2).

$$u_{1c} = q_{1c} \cos \chi_{10} + R_{b10} \sin \chi_{10}$$

$$v_{1c} = q_{1c} \sin \chi_{10} - R_{b10} \cos \chi_{10}$$

$$z_{1c} = z_{1c} \qquad (2)$$

The relationship between the coordinate systems $C_1$ and $C_2$ is expressed by the following expressions (3).

$$u_{1c} = -u_{2c} \cos \Sigma - z_{2c} \sin \Sigma$$

$$v_{1c} = v_{2c} + E$$

$$z_{1c} = u_{2c} \sin \Sigma - z_{2c} \cos \Sigma \qquad (3)$$

1.2 Instantaneous Axis (Relative Rotational Axis) S

Figure 4:
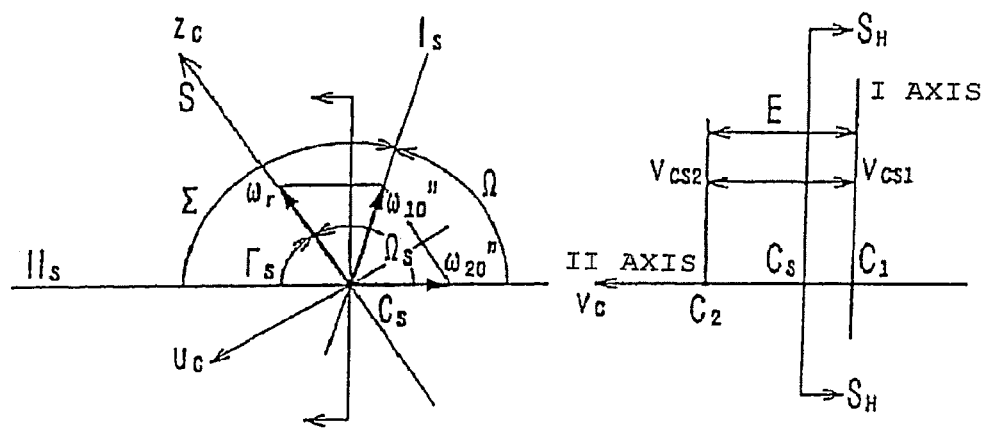
FIG. 4 is a diagram for explaining a relationship between gear axes I and II and an instantaneous axis S.

FIG. 4 shows a relationship between an instantaneous axis and a coordinate system $C_S$. If the orthogonal projections of the two axes I ($\omega_{10}$) and II ($\omega_{20}$) to the plane $S_H$ are designated by $I_s$ ($\omega_{10}''$) and $II_s$ ($\omega_{20}''$), respectively, and an angle of $I_s$ with respect to $II_s$ when the plane $S_H$ is viewed from the positive direction of the line of centers $v_c$ to the negative direction thereof is designated by $\Omega$, $I_s$ is in a zone of $0 \leq \Omega \leq \pi$ (the positive direction of the angle $\Omega$ is the counterclockwise direction) with respect to $II_S$ in accordance with the definition of $\omega_{20} \times \omega_{10}$. If an angle of the instantaneous axis S ($\omega_r$) to the $II_s$ on the plane $S_H$ is designated by $\Omega_S$ (the positive direction of the angle $\Omega_S$ is the counterclockwise direction), the components of $\omega_{10}''$ and $\omega_{20}''$ that are orthogonal to the instantaneous axis on the plane $S_H$ must be equal to each other in accordance with the definition of the instantaneous axis ($\omega_r = \omega_{10} - \omega_{20}$). Consequently, $\Omega_s$ satisfies the following expressions (4):

$$\sin \Omega_s / \sin(\Omega_s - \Omega) = \omega_{10}/\omega_{20}; \text{ or}$$

$$\sin \Gamma_s / \sin(\Sigma - \Gamma_s) = \omega_{10}/\omega_{20} \qquad (4)$$

wherein $\Sigma = \pi - \Omega$ (shaft angle) and $\Gamma_s = \pi - \Omega_s$. The positive directions are shown in the figure. In other words, the angle $\Gamma_s$ is an inclination of the instantaneous axis S with respect to the ring gear axis $II_s$ on the plane $S_H$, and the angle $\Gamma_s$ will hereinafter be referred to as an inclination angle of the instantaneous axis.

Figure 5:
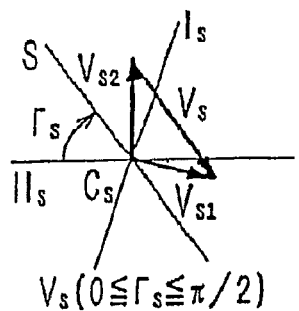
FIG. 5 is a diagram showing a relative velocity $V_s$ at a point $C_s$.
Figure 5:
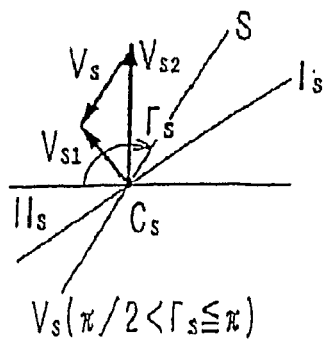

The location of $C_s$ on the line of centers $v_c$ can be obtained as follows. FIG. 5 shows a relative velocity $V_s$ (vector) of the point $C_s$. In accordance with the aforesaid supposition, $C_1$ is located under the position of $C_2$ with respect to the line of centers $v_c$ and $\omega_{10} \geq \omega_{20}$. Consequently, $C_s$ is located under $C_2$. If the peripheral velocities of the gears I, II at the point $C_s$ are designated by $V_{s1}$ and $V_{s2}$ (both being vectors), respectively, because the relative velocity $V_s$ ($=V_{s1}-V_{s2}$) exists on the instantaneous axis S, the components of $V_{s1}$ and $V_{s2}$ (existing on the plane $S_H$) orthogonal to the instantaneous axis must always be equal to each other. Consequently, the relative velocity $V_s$ ($=V_{s1}-V_{s2}$) at the point $C_s$ would have the shapes as shown in the same figure on the plane $S_H$ according to the location ($\Gamma_s$) of the instantaneous axis S, and the distance $C_2C_s$ between $C_2$ and $C_s$ can be obtained by the following expression (5). That is, $$C_2C_s = E \tan \Gamma_s / \{\tan(\Sigma - \Gamma_s) + \tan \Gamma_s\} \qquad (5)$$

The expression is effective within a range of $0 \leq \Gamma_s \leq \pi$, and the location of $C_s$ changes together with $\Gamma_s$, and the location of the point $C_s$ is located above $C_1$ in the case of $0 \leq \Gamma_s \leq \pi/2$, and the location of the point $C_s$ is located under $C_1$ in the case of $\pi/2 \leq \Gamma_s \leq \pi$.

1.3 Coordinate System $C_s$

Because the instantaneous axis S can be determined in a static space in accordance with the aforesaid expressions (4) and (5), the coordinate system $C_s$ is defined as shown in FIG. 4. The coordinate system $C_s(u_c, v_c, z_c)$ is composed of $C_s$ as its origin, the directed line of centers $v_c$ as its $v_c$ axis, the instantaneous axis S as its $z_c$ axis (the positive direction thereof is the direction of $\omega_r$), and its $u_c$ axis taken to be normal to both the axes as a right-handed coordinate system. Because it is assumed that a pair of gears being objects transmit a motion of a constant ratio of angular velocity, the coordinate system $C_s$ becomes a coordinate system fixed in the static space, and the coordinate system $C_s$ is a basic coordinate system in the case of treating a pair of gears performing the transmission of the motion of constant ratio of angular velocity together with the previously defined coordinate systems $C_1$ and $C_2$.

1.4 Relationship Among Coordinate Systems $C_1$, $C_2$, and $C_s$

If the points $C_1$ and $C_2$ are expressed to be $C_1$ (0, $v_{cs1}$, 0) and $C_2$ (0, $v_{cs2}$, 0) by the use of the coordinate system $C_s$, $v_{cs1}$ and $v_{cs2}$ are expressed by the following expressions (6).

$$V_{cs2} = C_s C_2 = E \tan \Gamma_s / \{\tan(\Sigma - \Gamma_s) + \tan \Gamma_s\} \qquad (6)$$

$$V_{cs1} = C_s C_1 - V_{cs2} - E$$

$$= -E \tan(\Sigma - \Gamma_s) / \{\tan(\Sigma - \Gamma_s) + \tan \Gamma_s\}$$

If it is noted that $C_2$ is always located above $C_s$ with respect to the $v_c$ axis, the relationships among the coordinate system $C_s$ and the coordinate systems $C_1$ and $C_2$ can be expressed as the following expressions (7) and (8) with the use of $v_{cs1}$, $v_{cs2}$, $\Sigma$, and $\Gamma_s$.

$$u_{1c} = u_c \cos(\Sigma - \Gamma_s) + z_c \sin(\Sigma - \Gamma_s)$$

$$v_{1c} = v_c - v_{cs1}$$

$$z_{1c} = -u_c \sin(\Sigma - \Gamma_s) + z_c \cos(\Sigma - \Gamma_s) \qquad (7)$$

$$u_{2c} = -u_c \cos \Gamma_s + z_c \sin \Gamma_s$$

$$v_{2c} = v_c - v_{cs2}$$

$$z_{2c} = -u_c \sin \Gamma_s - z_c \cos \Gamma_s \qquad (8)$$

Figure 6:
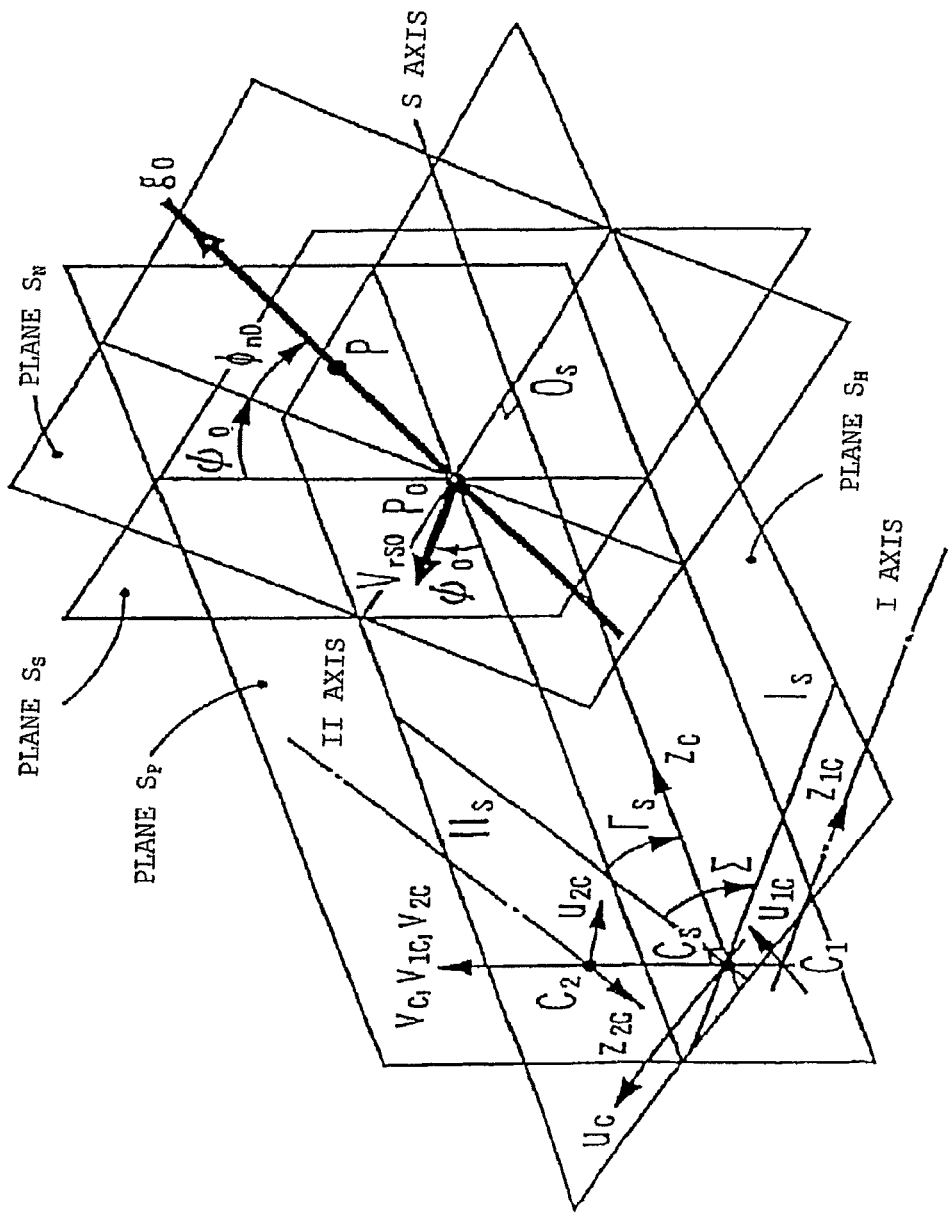
FIG. 6 is a diagram showing, along with planes $S_H$, $S_s$, $S_p$, and $S_n$, a reference point $P_0$, a relative velocity $V_{rs0}$, and a path of contact $g_0$.

The relationships among the coordinate system $C_s$ and the coordinate systems $C_1$ and $C_2$ are conceptually shown in FIG. 6.

Figure 7:
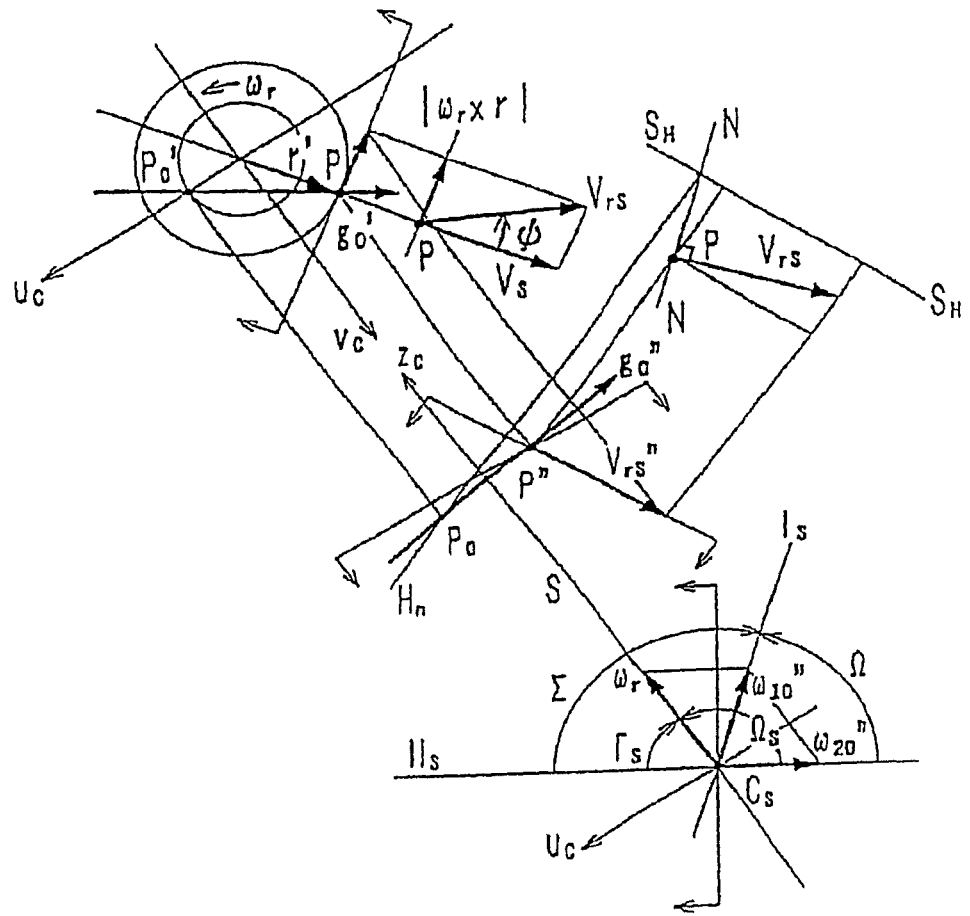
FIG. 7 is a diagram showing a relationship between a relative velocity $V_{rs}$ and a path of contact $g_0$ at a point P.

2. Definition of Path of Contact $g_0$ by Coordinate System $C_s$ 2.1 Relationship Between Relative Velocity and Path of Contact $g_0$ FIG. 7 shows a relationship between the set path of contact $g_0$ and a relative velocity $V_{rs}$ (vector) at an arbitrary point P on $g_0$. Incidentally, a prime sign (') and a double-prime sign (") in the figure indicate orthogonal projections of a point and a vector on the target plane. If the position vector of the P from an arbitrary point on the instantaneous axis S is designated by r when a tooth surface contacts at the arbitrary point P on the path of contact $g_0$, the relative velocity $V_{rs}$ at the point P can be expressed by the following expression (9).

$$v_{rs} = \omega_r \times r + V_s \quad (9)$$

where $$\omega_r = \omega_{10} - \omega_{20}$$

$$\omega_r = \omega_{20} \sin\Sigma/\sin(\Sigma-\Gamma_s) = \omega_{10} \sin\Sigma/\sin\Gamma_s$$

$$V_s = \omega_{10} \times [C_1 C_s] - \omega_{20} \times [C_2 C_s]$$

$$V_s = \omega_{20} E \sin\Gamma_s = \omega_{10} E \sin(\Sigma-\Gamma_s)$$

Here, $[C_1C_s]$ indicates a vector having $C_1$ as its starting point and $C_s$ as its end point, and $[C_2C_s]$ indicates a vector having $C_2$ as its starting point and $C_s$ as its end point.

The relative velocity $V_{rs}$ exists on a tangential plane of the surface of a cylinder having the instantaneous axis S as an axis, and an inclination angle $\psi$ relative to $V_s$ on the tangential plane can be expressed by the following expression (10).

$$\cos\psi = |V_s|/|V_{rs}| \quad (10)$$

Because the path of contact $g_0$ is also the line of centers of a tooth surface at the point of contact, $g_0$ is orthogonal to the relative velocity $V_{rs}$ at the point P. That is, $$V_{rs} \cdot g_0 = 0$$

Consequently, $g_0$ is a directed straight line on a plane N normal to $V_{rs}$ at the point P. If the line of intersection of the plane N and the plane $S_H$ is designated by $H_n$, $H_n$ is in general a straight line intersecting with the instantaneous axis S, with $g_0$ necessarily passing through the $H_n$ if an infinite intersection point is included. If the intersection point of $g_0$ with the plane $S_H$ is designated by $P_0$, then $P_0$ is located on the line of intersection $H_n$, and $g_0$ and $P_0$ become as follows according to the kinds of pairs of gears.

(1) Case of Cylindrical Gears or Bevel Gears ($\Sigma=0, \pi$ or $E=0$)

Because $V_s=0$, $V_{rs}$ simply means a peripheral velocity around the instantaneous axis S. Consequently, the plane N includes the S axis. Hence, $H_n$ coincides with S, and the path of contact $g_0$ always passes through the instantaneous axis S. That is, the point $P_0$ is located on the instantaneous axis S. Consequently, for these pairs of gears, the path of contact $g_0$ is an arbitrary directed straight line passing at the arbitrary point $P_0$ on the instantaneous axis.

(2) Case of Gear Other than that Described Above ($\Sigma\neq0, \pi$ or $E\neq0$)

In the case of a hypoid gear, a crossed helical gear or a worm gear, if the point of contact P is selected at a certain position, the relative velocity $V_{rs}$, the plane N, and the straight line $H_n$, all peculiar to the point P, are determined. The path of contact $g_0$ is a straight line passing at the arbitrary point $P_0$ on $H_n$, and does not, in general, pass through the instantaneous axis S. Because the point P is arbitrary, $g_0$ is also an arbitrary directed straight line passing at the point $P_0$ on a plane normal to the relative velocity $V_{rs0}$ at the intersection point $P_0$ with the plane $S_H$. That is, the aforesaid expression (9) can be expressed as follows.

$$V_{rs} = V_{rs0} + \omega_r \times [P_0 P] \cdot g_0$$

Here, $[P_0P]$ indicates a vector having $P_0$ as its starting point and the P as its end point. Consequently, if $V_{rs0} \cdot g_0 = 0$, $V_{rs} \cdot g_0 = 0$, and the arbitrary point P on $g_0$ is a point of contact.

2.2 Selection of Reference Point

Among pairs of gears having two axes with known positional relationship and the angular velocities, pairs of gears with an identical path of contact $g_0$ have an identical tooth profile corresponding to $g_0$, with the only difference between them being which part of the tooth profile issued effectively. Consequently, in design of a pair of gears, the position at which the path of contact $g_0$ is disposed in a static space determined by the two axes is important. Further, because a design reference point is only a point for defining the path of contact $g_0$ in the static space, the position at which the design reference point is selected on the path of contact $g_0$ does not cause any essential difference. When an arbitrary path of contact $g_0$ is set, the $g_0$ necessarily intersects with a plane $S_H$ including the case where the intersection point is located at an infinite point. Thus, the path of contact $g_0$ is determined with the point $P_0$ on the plane $S_H$ (on an instantaneous axis in the case of cylindrical gears and bevel gears) as the reference point.

Figure 8:
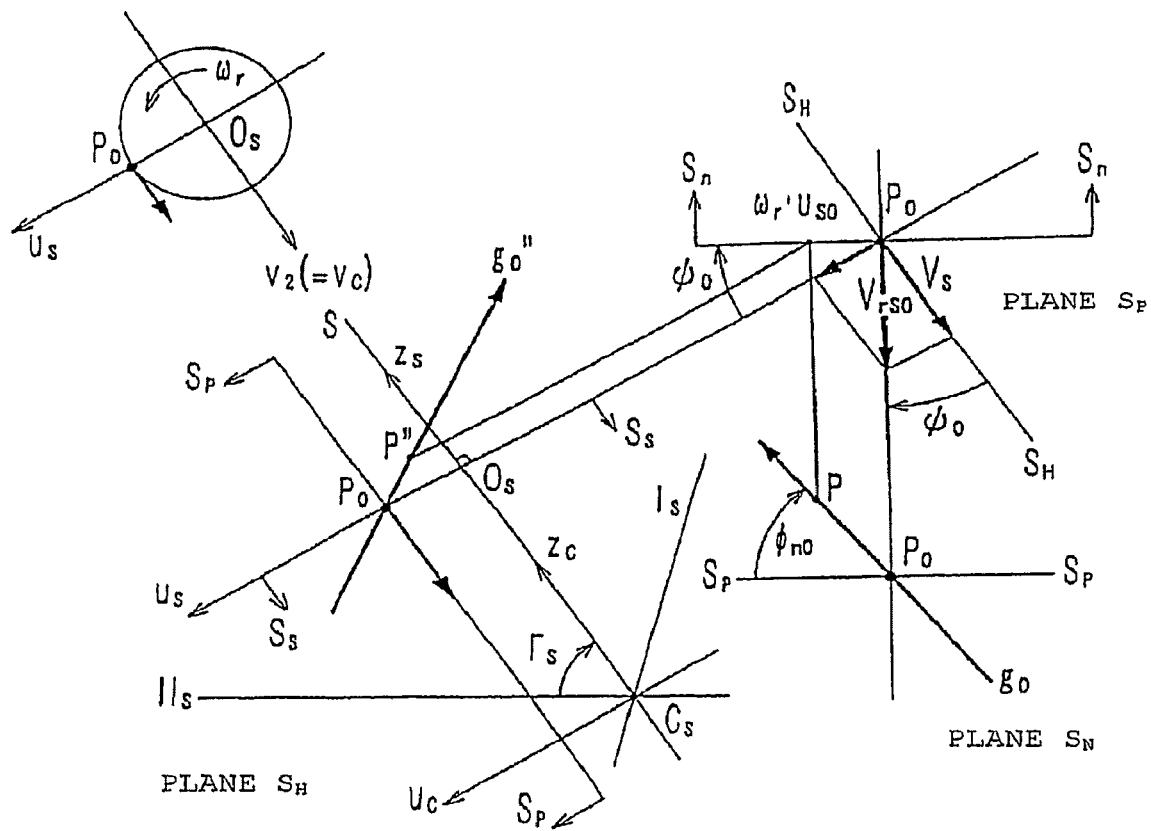
FIG. 8 is a diagram showing a relative velocity $V_{rs0}$ and a path of contact $g_0$ at a reference point $P_0$, with a coordinate system $C_s$.

FIG. 8 shows the reference point $P_0$ and the path of contact $g_0$ by the use of the coordinate system $C_s$. When the reference point expressed by means of the coordinate system $C_s$ is designated by $P_0$ ($u_{c0}$, $v_{c0}$, $z_{c0}$), each coordinate value can be expressed as follows.

$$u_{c0} = O_s P_0$$

$$v_{c0} = 0$$

$$z_{c0} = C_s O_s$$

For cylindrical gears and bevel gears, $u_{c0}=0$. Furthermore, the point $O_s$ is the intersection point of a plane $S_s$, passing at the reference point $P_0$ and being normal to the instantaneous axis S, and the instantaneous axis S.

2.3 Definition of Inclination Angle of Path of Contact $g_0$

The relative velocity $V_{rs0}$ at the point $P_0$ is concluded as follows with the use of the aforesaid expression (9).

$$V_{rs0} = \omega_r \times [u_{c0}] + V_s$$

where, $[u_{c0}]$ indicates a vector having $O_s$ as its starting point and $P_0$ as its end point. If a plane ($u_c = u_{c0}$) being parallel to the instantaneous axis S and being normal to the plane $S_H$ at the point $P_0$ is designated by $S_p$, $v_{rs0}$ is located on the plane $S_p$, and the inclination angle $\psi_0$ of $V_{rs0}$ from the plane $S_H$ ($v_c=0$) can be expressed by the following expression (11) with the use of the aforesaid expression (10).

$$\tan\psi_0 = \omega_r u_{c0}/V_s \quad (11)$$

$$= u_{c0} \sin\Sigma/\{E\sin(\Sigma-\Gamma_s)\sin\Gamma_s\}$$

Incidentally, $\psi_0$ is assumed to be positive when $u_{c0}\geq0$, and the direction thereof is shown in FIG. 8.

If a plane passing at the point $P_0$ and being normal to $V_{rs0}$ is designated by $S_n$, the plane $S_n$ is a plane inclining to the plane $S_s$ by the $\psi_0$, and the path of contact $g_0$ is an arbitrary directed straight line passing at the point $P_0$ and located on the plane $S_n$. Consequently, the inclination angle of $g_0$ in the coordinate system $C_s$ can be defined with the inclination angle $\psi_0$ of the plane $S_n$ from the plane $S_s$ (or the $v_c$ axis) and the inclination angle $\varphi_{n0}$ from the plane $S_p$ on the plane $S_n$, and the defined inclination angle is designated by $g_0$ ($\psi_0$, $\varphi_{n0}$). The positive direction of $\varphi_{n0}$ is the direction shown in FIG. 8.

2.4. Definition of $g_0$ by Coordinate System $C_s$

FIG. 6 shows relationships among the coordinate system $C_s$, the planes $S_H$, $S_s$, $S_p$ and $S_n$, $P_0$ and $g_0(\psi_0, \varphi_{n0})$. The plane $S_H$ defined here corresponds to a pitch plane in the case of cylindrical gears and an axial plane in the case of a bevel gear according to the current theory. The plane $S_s$ is a transverse plane, and the plane $S_p$ corresponds to the axial plane of the cylindrical gears and the pitch plane of the bevel gear. Furthermore, it can be considered that the plane $S_n$ is a normal plane expanded to a general gear, and that $\varphi_{n0}$ and $\psi_0$ also are a normal pressure angle and a spiral angle expanded to a general gear, respectively. By means of these planes, pressure angles and spiral angles of a pair of general gears can be expressed uniformly to static spaces as inclination angles to each plane of line of centers ($g_0$'s in this case) of points of contact. The planes $S_n$, $\varphi_{n0}$, and $\varphi_0$ defined here coincide with those of a bevel gear of the current theory, and differ for other gears because the current theory takes pitch planes of individual gears as standards, and then the standards change to a static space according to the kinds of gears. With the current theory, if a pitch body of revolution (a cylinder or a circular cone) is determined, it is sufficient to generate a mating surface by fixing an arbitrary curved surface to the pitch body of revolution as a tooth surface, and in the current theory, conditions of the tooth surface (a path of contact and the normal thereof) are not limited except for the limitations of manufacturing. Consequently, the current theory emphasizes the selection of $P_0$ (for discussions about pitch body of revolution), and there has been little discussion concerning design of $g_0$ (i.e. a tooth surface realizing the $g_0$) beyond the existence of a tooth surface.

For a pair of gears having the set shaft angle $\Sigma$ thereof, the offset E thereof, and the directions of angular velocities, the path of contact $g_0$ can generally be defined in the coordinate system $C_s$ by means of five independent variables of the design reference point $P_0$ ($u_{c0}$, $v_{c0}$, $z_{c0}$) and the inclination angle $g_0$ ($\psi_0$, $\varphi_{n0}$). Because the ratio of angular velocity $i_0$ and $v_{c0}=0$ are set as design conditions in the present embodiment, there are three independent variables of the path of contact $g_0$. That is, the path of contact $g_0$ is determined in a static space by the selections of the independent variables of two of ($z_{c0}$), $\varphi_{n0}$, and $\psi_0$ in the case of cylindrical gears because $z_{c0}$ has no substantial meaning, three of $z_{c0}$, $\varphi_{n0}$, and $\psi_0$ in the case of a bevel gear, or three of $z_{c0}$, $\varphi_{n0}$, and $\psi_0$ (or $u_{c0}$) in the case of a hypoid gear, a worm gear, or a crossed helical gear. When the point $P_0$ is set, $\psi_0$ is determined at the same time and only $\varphi_{n0}$ is a freely selectable variable in the case of the hypoid gear and the worm gear. However, in the case of the cylindrical gears and the bevel gear, because $P_0$ is selected on an instantaneous axis, both of $\psi_0$ and $\varphi_{n0}$ are freely selectable variables.

3. Pitch Hyperboloid

3.1 Tangential Cylinder of Relative Velocity

Figure 9:
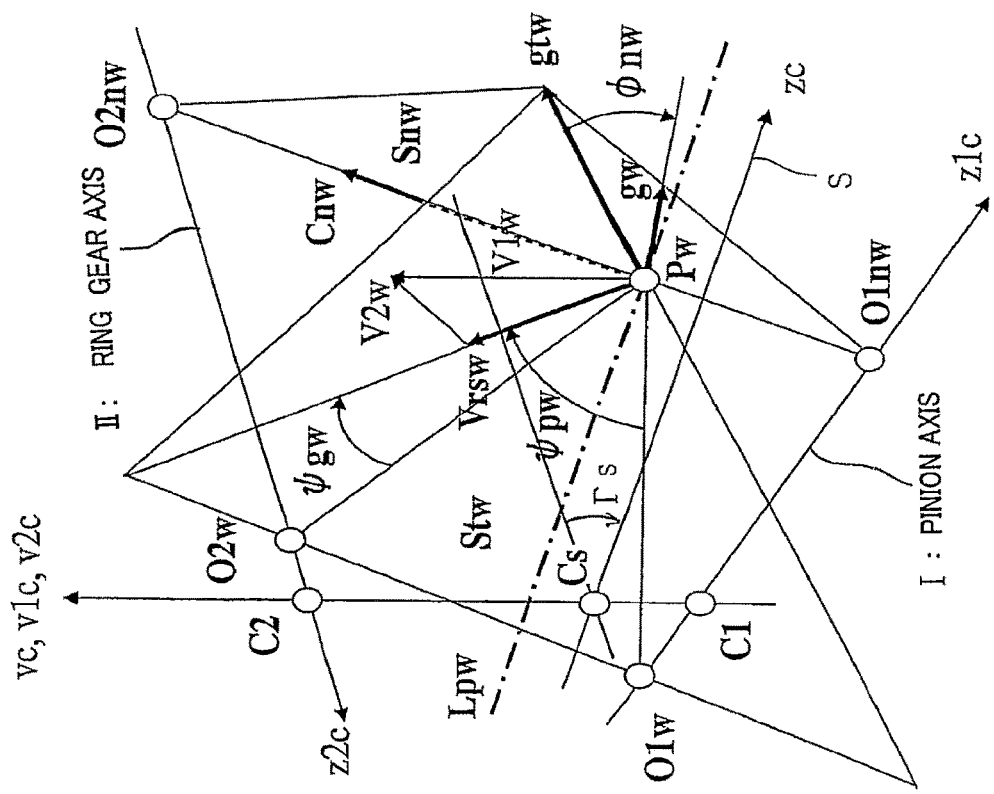
FIG. 9 is a diagram showing coordinate systems $C_1$, $C_2$, and $C_s$ of a hypoid gear and a pitch generating line $L_{pw}$.
Figure 10:
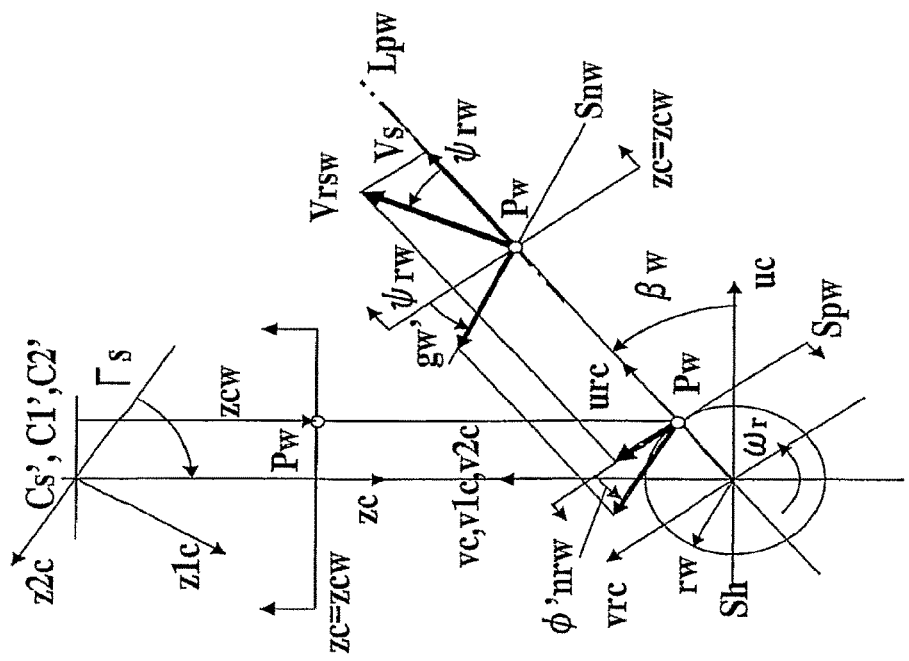
FIG. 10 is a diagram showing a tangential cylinder of a relative velocity $V_{rsw}$.

FIG. 9 is a diagram showing an arbitrary point of contact $P_w$, a contact normal $g_w$ thereof, a pitch plane $S_{nw}$, the relative velocity $V_{rsw}$, and a plane $S_{nw}$ which is normal to the relative velocity $V_{rsw}$ of a hypoid gear, along with basic coordinate systems $C_1$, $C_2$, and $C_s$. FIG. 10 is a diagram showing FIG. 9 drawn from a positive direction of the $z_c$ axis of the coordinate system $C_s$. The arbitrary point $P_w$ and the relative velocity $V_{rsw}$ are shown with cylindrical coordinates $P_w(r_w, \beta_w, z_{cw}: C_s)$. The relative velocity $V_{rsw}$ is inclined by $\psi_{rw}$ from a generating line $L_{pw}$ on the tangential plane $S_{pw}$ of the cylinder having the $z_c$ axis as its axis, passing through the arbitrary point $P_w$, and having a radius of $r_w$.

When the coordinate system $C_s$ is rotated around the $z_c$ axis by $\beta_w$ to realize a coordinate system $C_{rs}$ ($u_{rc}$, $v_{rc}$, $z_c$: $C_{rs}$), the tangential plane $S_{pw}$ can be expressed by $u_{rc}=r_w$, and the following relationship is satisfied between $u_{rc}=r_w$ and the inclination angle $\psi_{rw}$ of $V_{rsw}$.

$$u_{rc} = r_w = V_s \tan\psi_{rw}/\omega_r \qquad (12)$$

$$= E\tan\psi_{rw} \times \sin(\Sigma - \Gamma_s)\sin\Gamma_s/\sin\Sigma$$

where Vs represents a sliding velocity in the direction of the instantaneous axis and $\omega_r$ represents a relative angular velocity around the instantaneous axis.

The expression (12) shows a relationship between $r_w$ of the arbitrary point $P_w$ ($r_w$, $\beta_w$, $z_{cw}$: $C_s$) and the inclination angle $\psi_{rw}$ of the relative velocity $V_{rsw}$ thereof. In other words, when $\psi_{rw}$ is set, $r_w$ is determined. Because this is true for arbitrary values of $\beta_w$, and $z_{cw}$, $P_w$ with a constant $\psi_{rw}$ defines a cylinder with a radius $r_w$. This cylinder is called the tangential cylinder of the relative velocity.

3.2 Pitch Generating Line and Surface of Action

When $r_w$ (or $\psi_{pw}$) and $\beta_w$ are set, $P_w$ is determined on the plane $z_c = z_{cw}$. Because this is true for an arbitrary value of $z_{cw}$, points $P_w$ having the same $r_w$ (or $\psi_{rw}$) and the same $\beta_w$ draw a line element of the cylinder having a radius $r_w$. This line element is called a pitch generating line $L_{pw}$. A directed straight line which passes through a point $P_w$ on a plane $S_{nw}$ orthogonal to the relative velocity $V_{rsw}$ at the arbitrary point $P_w$ on the pitch generating line $L_{pw}$ satisfies a condition of contact, and thus becomes a contact normal.

Figure 11:
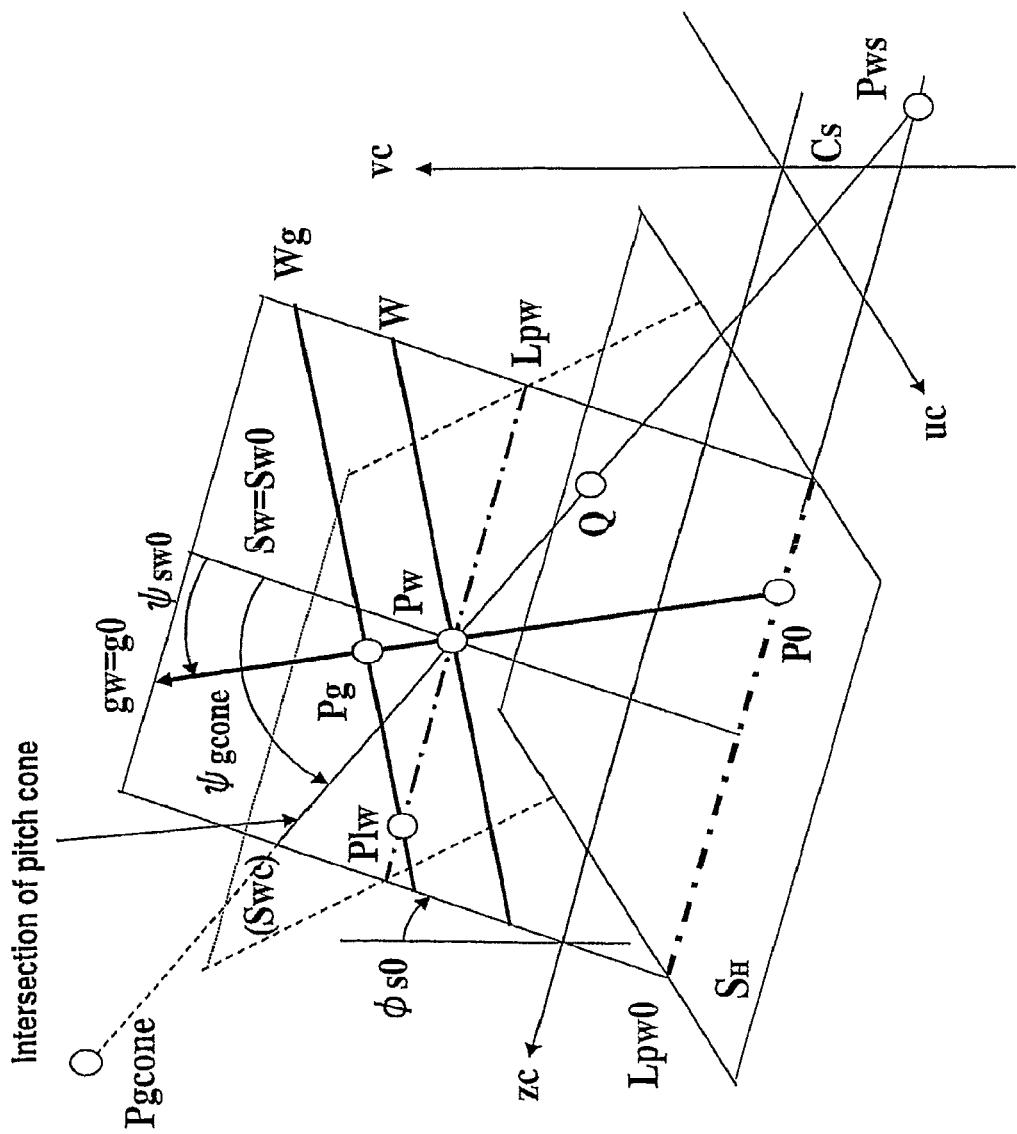
FIG. 11 is a diagram showing a relationship between a pitch generating line $L_{pw}$, a path of contact $g_w$, and a surface of action $S_w$ at a design reference point $P_w$.

FIG. 11 is a diagram conceptually drawing relationships among the pitch generating line $L_{pw}$, directed straight line $g_w$, surface of action $S_w$, contact line w, and a surface of action $S_{wc}$ (dotted line) on the side C to be coast. A plane having an arbitrary directed straight line $g_w$ on the plane $S_{nw}$ passing through the point $P_w$ as a normal is set as a tooth surface W. Because all of the relative velocity $V_{rsw}$ at the arbitrary point $P_w$ on the pitch generating line $L_{pw}$ are parallel and the orthogonal planes $S_{nw}$ are also parallel, of the normals of the tooth surface W, any normal passing through the pitch generating line $L_{pw}$ becomes a contact normal, and a plane defined by the pitch generating line $L_{pw}$ and the contact normal $g_w$ becomes the surface of action $S_w$ and an orthogonal projection of the pitch generating line $L_{pw}$ to the tooth surface W becomes the contact line w. Moreover, because the relationship is similarly true for another normal $g_{wc}$ on the plane $S_{nw}$ passing through the point $P_w$ and the surface of action $S_{wc}$ thereof, the pitch generating line $L_{pw}$ is a line of intersection between the surfaces of action of two tooth surfaces (on the drive-side D and coast-side C) having different contact normals on the plane $S_{nw}$.

3.3 Pitch Hyperboloid

The pitch generating line $L_{pw}$ is uniquely determined by the shaft angle $\Sigma$, offset E, gear ratio $i_0$, inclination angle $\psi_{rw}$ of relative velocity $V_{rsw}$, and rotation angle $\beta_w$ from the coordinate system $C_s$ to the coordinate system $C_{rs}$. A pair of hyperboloids which are obtained by rotating the pitch generating line $L_{pw}$ around the two gear axes, respectively, contact each other in a line along $L_{pw}$, and because the line $L_{pw}$ is also a line of intersection between the surfaces of action, the drive-side D and the coast-side C also contact each other along the line $L_{pw}$. Therefore, the hyperboloids are suited as revolution bodies for determining the outer shape of the pair of gears. In the present invention, the hyperboloids are set as the design reference revolution bodies, and are called the pitch hyperboloids. The hyperboloids in the related art are revolution bodies in which the instantaneous axis S is rotated around the two gear axes, respectively, but in the present invention, the pitch hyperboloid is a revolution body obtained by rotating a parallel line having a distance $r_w$ from the instantaneous axis.

In the cylindrical gear and the bevel gear, $L_{pw}$ coincides with the instantaneous axis S or $z_c$ ($r_w \to 0$) regardless of $\psi_{rw}$ and $\beta_w$, because of special cases of the pitch generating line $L_{pw}$ ($V_s \to 0$ as $\Sigma \to 0$ or $E \to 0$ in the expression (12)). The instantaneous axis S is a line of intersection of the surfaces of action of the cylindrical gear and the bevel gear, and the revolution bodies around the gear axes are the pitch cylinder of the cylindrical gear and the pitch cone of the bevel gear.

For these reasons, the pitch hyperboloids which are the revolution bodies of the pitch generating line $L_{pw}$ have the common definition of the expression (12) from the viewpoint that the hyperboloid is a "revolution body of line of intersection of surfaces of action" and can be considered to be a design reference revolution body for determining the outer shape of the pair of gears which are common to all pairs of gears.

3.4 Tooth Trace (New Definition of Tooth Trace)

In the present invention, a curve on the pitch hyperboloid (which is common to all gears) obtained by transforming a path of contact to a coordinate system which rotates with the gear when the tooth surface around the point of contact is approximated with its tangential plane and the path of contact is made coincident with the line of intersection of the surfaces of action (pitch generating line $L_{pw}$) is called a tooth trace (curve). In other words, a tooth profile, among arbitrary tooth profiles on the tooth surface, in which the path of contact coincides with the line of intersection of the surface of action is called a tooth trace. The tooth trace of this new definition coincides with the tooth trace of the related art defined as an intersection between the pitch surface (cone or cylinder) and the tooth surface in the cylindrical gears and the bevel gears and differs in other gears. In the case of the current hypoid gear, the line of intersection between the selected pitch cone and the tooth surface is called a tooth trace.

3.5 Contact Ratio

A total contact ratio m is defined as a ratio of a maximum angular displacement and an angular pitch of a contact line which moves on an effective surface of action (or effective tooth surface) with the rotation of the pair of gears. The total contact ratio m can be expressed as follows in terms of the angular displacement of the gear.

$$m = (\theta_{2max} - \theta_{2min})/(2\theta_{2p})$$

where $\theta_{2max}$ and $\theta_{2min}$ represent maximum and minimum gear angular displacements of the contact line and $2\theta_{2p}$ represents a gear angular pitch.

Because it is very difficult to represent the position of the contact line as a function of a rotation angle except for special cases (involute helicoid) and it is also difficult to represent such on the tooth surface (curved surface), in the stage of design, the surface of action has been approximated with a plane in a static space, a path of contact has been set on the surface of action, and an contact ratio has been determined and set as an index along the path of contact.

Figure 12:
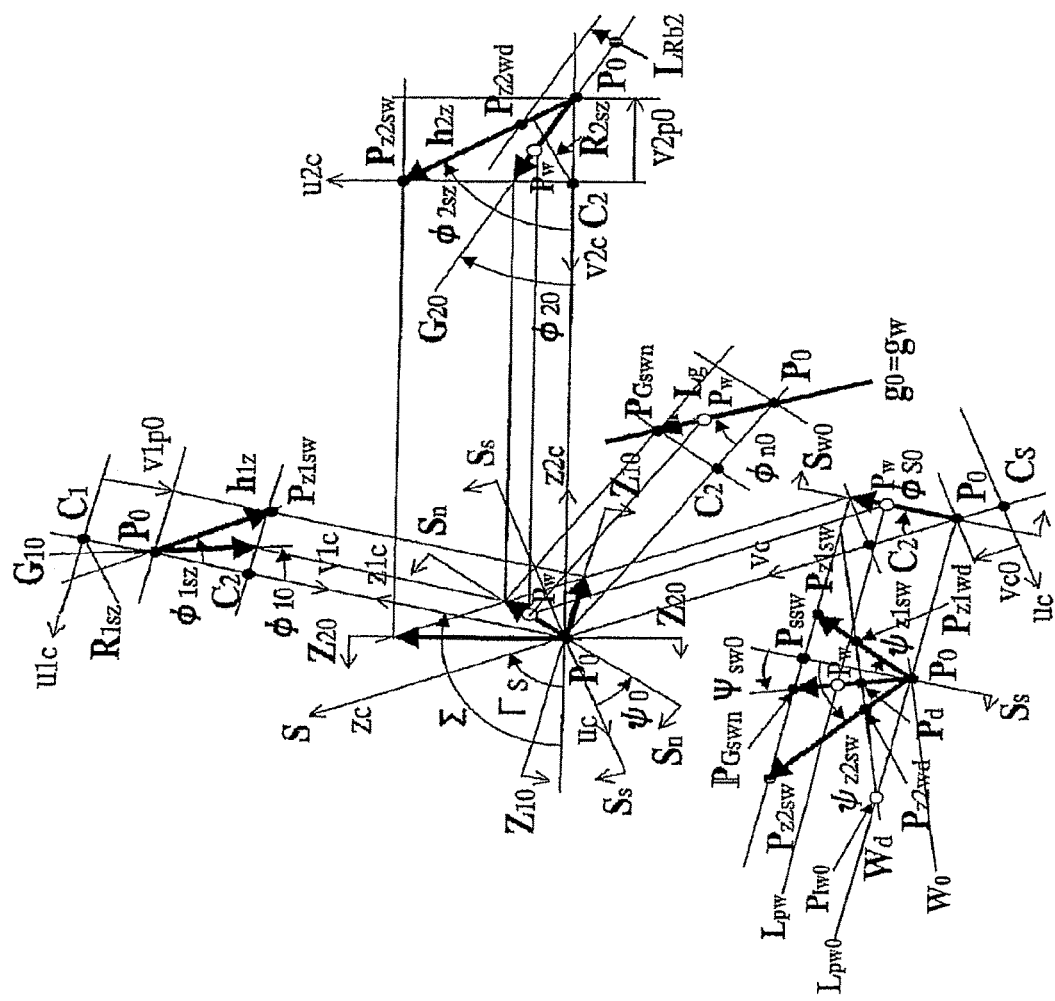
FIG. 12 is a diagram showing a surface of action using coordinate systems $C_s$, $C_1$, and $C_2$ in the cases of a cylindrical gear and a crossed helical gear.
Figure 13:
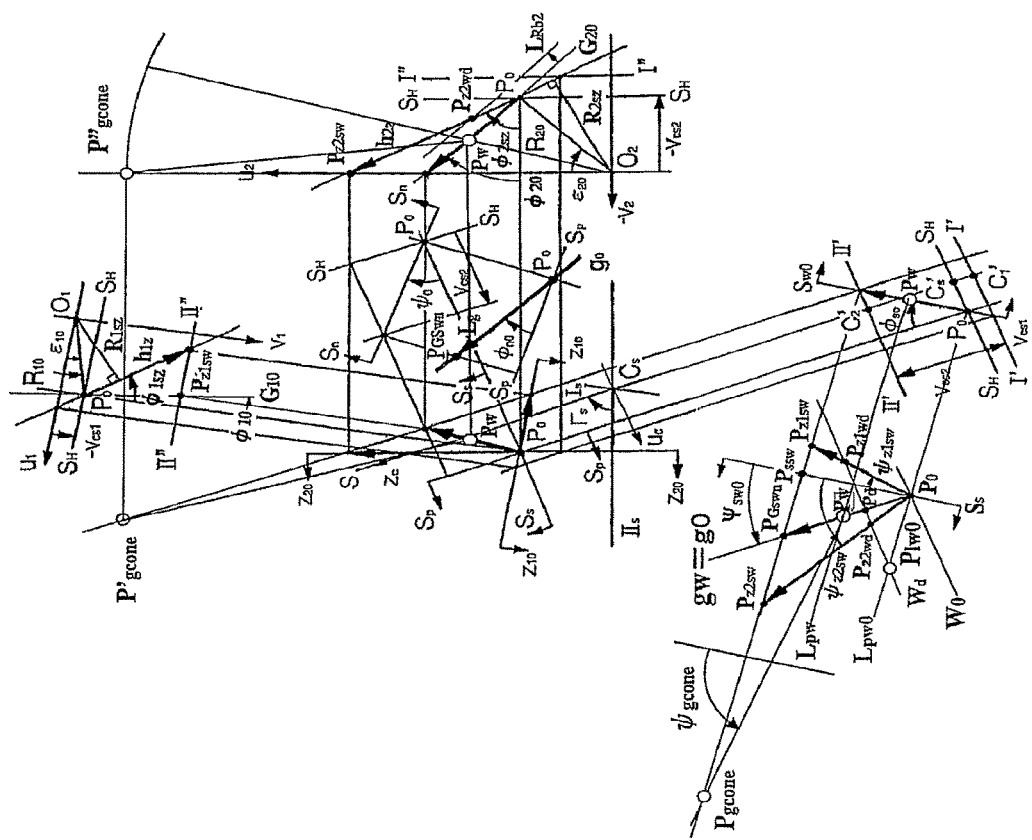
FIG. 13 is a diagram showing a surface of action using coordinate systems $C_s$, $C_1$, and $C_2$ in the cases of a bevel gear and a hypoid gear.

FIGS. 12 and 13 show the surface of action conceptually shown in FIG. 11 in more detail with reference to the coordinate systems $C_s$, $C_1$, and $C_2$. FIG. 12 shows a surface of action in the cases of the cylindrical gear and a crossed helical gear, and FIG. 13 shows a surface of action in the cases of the bevel gear and the hypoid gear. FIGS. 12 and 13 show surfaces of action with the tooth surface (tangential plane) when the intersection between $g_w$ and the reference plane $S_H$ ($v_c = 0$) is set as $P_0$ ($u_{c0}$, $v_{c0} = 0$, $z_{c0}$: $C_s$), the inclination angle of $g_w$ is represented in the coordinate system $C_s$, and the contact normal $g_w$ is set $g_w = g_0$ ($\psi_0$, $\varphi_{n0}$: $C_s$). A tooth surface passing through $P_0$ is shown as $W_0$, a tooth surface passing through an arbitrary point $P_d$ on $g_w = g_0$ is shown as $W_d$, a surface of action is shown by $S_w = S_{w0}$, and an intersection between the surface of action and the plane $S_H$ is shown with $L_{pw0}$ (which is parallel to $L_{pw}$). Because planes are considered as the surface of action and the tooth surface, the tooth surface translates on the surface of action. The point $P_w$ may be set at any point, but because the static coordinate system $C_s$ has its reference at the point $P_0$ on the plane $S_H$, the contact ratio is defined with an example configuration in which $P_w$ is set at $P_0$.

The contact ratio of the tooth surface is defined in the following manner depending on how the path of contact passing through $P_w = P_0$ is defined on the surface of action $S_w = S_{w0}$:

(1) Contact Ratio $m_z$ Orthogonal Axis

This is a ratio between a length separated by an effective surface of action (action limit and the tooth surface boundary) of lines of intersection $h_{1z}$ and $h_{2z}$ ($P_0 P_{z1sw}$ and $P_0 P_{z2sw}$ in FIGS. 12 and 13) between the surface of action $S_{w0}$ and the planes of rotation $Z_{10}$ and $Z_{20}$ and a pitch in this direction;

(2) Tooth Trace Contact Ratio $m_f$

This is a ratio between a length of $L_{pw0}$ which is parallel to the instantaneous axis separated by the effective surface of action and a pitch in this direction;

(3) Transverse Contact Ratio $m_s$

This is a ratio between a length separated by an effective surface of action of a line of intersection ($P_0 P_{ssw}$ in FIGS. 12 and 13) between a plane $S_s$ passing through $P_0$ and normal to the instantaneous axis and $S_{w0}$ and a pitch in this direction;

(4) Contact Ratio in Arbitrary Direction

This includes cases where the path of contact is set in a direction of $g_0$ ($P_0 P_{Gswn}$ in FIG. 13) and cases where the path of contact is set in a direction of a line of intersection ($P_w P_{gcon}$ in FIGS. 12 and 13) between an arbitrary conical surface and $S_{w0}$;

(5) Total Contact Ratio

This is a sum of contact ratios in two directions (for example, (2) and (3)) which are normal to each other on the surface of action, and is used as a substitute for the total contact ratio.

In addition, except for points on $g_w = g_0$, the pitch (length) would differ depending on the position of the point, and the surface of action and the tooth surface are actually not planes. Therefore, only an approximated value can be calculated for the contact ratio. Ultimately, a total contact ratio determined from the angular displacement must be checked.

3.6 General Design Method of Gear Using Pitch Hyperboloid

In general, a gear design can be considered, in a simple sense, to be an operation, in a static space (coordinate system $C_s$) determined by setting the shaft angle $\Sigma$, offset E, and gear ratio $i_0$, to:

(1) select a pitch generating line and a design reference revolution body (pitch hyperboloid) by setting a design reference point $P_w(r_w(\psi_{rw}), \beta_w, z_{cw}: C_{rs})$; and (2) set a surface of action (tooth surface) having $g_w$ by setting an inclination angle ($\psi_{rw}, \varphi_{nrw}: C_{rs}$) of a tooth surface normal $g_w$ passing through $P_w$.

In other words, the gear design method (selection of $P_w$ and $g_w$) comes down to selection of four variables including $r_w$ (normally, $\psi_{rw}$ is set), $\beta_w$, $z_{cw}$ (normally, $R_{2w}$ (gear pitch circle radius) is set in place of $z_{cw}$), and $\varphi_{nrw}$. A design method for a hypoid gear based on the pitch hyperboloid when $\Sigma$, E, and $i_0$ are set will be described below.

3.7 Hypoid Gear ($-\pi/2 < \beta_w < \pi/2$)

(1) Various hypoid gears can be realized depending on how $\beta_w$ is selected, even with set values for $\varphi_{rw}$ ($r_w$) and $z_{cw}$ ($R_{2w}$).

(a) From the viewpoint of the present invention, the Wildhaber (Gleason) method is one method of determining $P_w$ by determining $\beta_w$ through setting of a constraint condition to "make the radius of curvature of a tooth trace on a plane (FIG. 9) defined by peripheral velocities of a pinion and ring gear at $P_w$ coincide with the cutter radius". However, because the tooth surface is possible as long as an arbitrary curved surface (therefore, arbitrary radius of curvature of tooth trace) having $g_w$ passing through $P_w$ has a mating tooth surface, this condition is not necessarily a requirement even when a conical cutter is used. In addition, although this method employs circular cones which circumscribe at $P_w$, the pair of gears still contact on a surface of action having the pitch generating line $L_{pw}$ passing through $P_w$ regardless of the cones. Therefore, the line of intersection between the pitch cone circumscribing at $P_w$ and the surface of action determined by this method differs from the pitch generating line $L_{pw}$ (line of intersection of surfaces of action). When $g_w$ is the same, the inclination angle of the contact line on the surface of action and $L_{pw}$ are equal to each other, and thus the pitch in the direction of the line of intersection between the surface of action and the pitch cone changes according to the selected pitch cone (FIG. 11). In other words, a large difference in the pitch is caused between the drive-side and the coast-side in the direction of the line of intersection between the pitch cone and the surface of action (and, consequently, the contact ratios in this direction). In the actual Wildhaber (Gleason) method, two cones are determined by giving pinion spiral angle and an equation of radius of curvature of tooth trace for contact equations of the two cones (seven equations having nine unknown variables), and thus the existence of the pitch generating line and the pitch hyperboloid is not considered.

(b) In a preferred embodiment described in section 4.2A below, $\beta_w$ is selected by giving a constraint condition that "a line of intersection between a cone circumscribing at $P_w$ and the surface of action is coincident with the pitch generating line $L_{pw}$". As a result, as will be described below, the tooth trace contact ratios on the drive-side and the coast-side become approximately equal to each other.

(2) Gear radius $R_{2w}$, $\beta_w$, and $\psi_{rw}$ are set and a design reference point $P_w(u_{cw}, v_{cw}, z_{cw}: C_s)$ is determined on the pitch generating line $L_{pw}$. The pitch hyperboloids can be determined by rotating the pitch generating line $L_{pw}$ around each tooth axis. A method of determining the design reference point will be described in section 4.2B below.

(3) A tooth surface normal $g_w$ passing through $P_w$ is set on a plane $S_{nw}$ normal to the relative velocity $V_{rsw}$ of $P_w$. The surface of action $S_w$ is determined by $g_w$ and the pitch generating line $L_{pw}$.

4. Design Method for Hypoid Gear

A method of designing a hypoid gear using the pitch hyperboloid will now be described in detail.

4.1 Coordinate Systems $C_s$, $C_1$, and $C_2$ and Reference Point $P_w$

When the shaft angle $\Sigma$, offset E, and gear ratio $i_0$ are set, the inclination angle $\Gamma_s$ of the instantaneous axis, and the origins $C_1(0, V_{cs1}, 0: C_s)$ and $C_2(0, v_{cs2}, 0: C_s)$ of the coordinate systems $C_1$ and $C_2$ are represented by the following expressions.

$$\sin \Gamma_s / \sin(\Sigma - \Gamma_s) = i_0$$

$$v_{cs2} = E \tan \Gamma_s / \{\tan(\Sigma - \Gamma_s) + \tan \Gamma_s\}$$

$$v_{cs1} = v_{cs2} - E$$

The reference point $P_w$ is set in the coordinate system $C_s$ as follows.

$$P_w(u_{cw}, v_{cw}, z_{cw}: C_s)$$

If $P_w$ is set as $P_w(r_w, \beta_w, z_{cw}: C_s)$ by representing $P_w$ with the cylindrical radius $r_w$ of the relative velocity and the angle $\beta_w$ from the $u_c$ axis, the following expressions hold.

$$u_{cw} = r_w \cos \beta_w$$

$$v_{cw} = r_w \sin \beta_w$$

The pitch generating line $L_{pw}$ is determined as a straight line which passes through the reference point $P_w$ and which is parallel to the instantaneous axis (inclination angle $\Gamma_s$), and the pitch hyperboloids are determined as revolution bodies of the pitch generating line $L_{pw}$ around the gear axes.

If the relative velocity of $P_w$ is $V_{rsw}$, the angle $\psi_{rw}$ between $V_{rsw}$ and the pitch generating line $L_{pw}$ is, based on expression (12), $$\tan \psi_{rw} = r_w \sin \Sigma / \{E \sin(\Sigma - \Gamma_s) \sin \Gamma_s\}$$

Here, $\psi_{rw}$ is the same anywhere on the same cylinder of the radius $r_w$.

When transformed into coordinate systems $C_1$ and $C_2$, $P_w(u_{1cw}, v_{1cw}, z_{1cw}: C_1)$, $P_w(u_{2cw}, v_{2cw}, z_{2cw}: C_2)$, and pinion and ring gear reference circle radii $R_{1w}$ and $R_{2w}$ can be expressed with the following expressions.

$$u_{1cw} = u_{cw} \cos(\Sigma - \Gamma_s) + z_{cw} \sin(\Sigma - \Gamma_s)$$

$$v_{1cw} = v_{cw} - v_{cs1}$$

$$z_{1cw} = -u_{cw} \sin(\Sigma - \Gamma_s) + z_{cw} \cos(\Sigma - \Gamma s)$$

$$u_{2cw} = -u_{cw} \cos \Gamma_s + z_{cw} \sin \Gamma_s$$

$$v_{2cw} = v_{cw} - v_{cs2}$$

$$z_{2cw} = -u_{cw} \sin \Gamma_s - z_{cw} \cos \Gamma_s$$

$$R_{1w}^2 = u_{1cw}^2 + v_{1cw}^2$$

$$R_{2w}^2 = u_{2cw}^2 + v_{2cw}^2 \qquad (13)$$

4.2A Cones Passing Through Reference Point $P_w$

A pitch hyperboloid which is a geometric design reference revolution body is difficult to manufacture, and thus in reality, in general, the gear is designed and manufactured by replacing the pitch hyperboloid with a pitch cone which passes through the point of contact $P_w$. The replacement with the pitch cones is realized in the present embodiment by replacing with cones which contact at the point of contact $P_w$.

The design reference cone does not need to be in contact at $P_w$, but currently, this method is generally practiced. When $\beta_w$ is changed, the pitch angle of the cone which contacts at $P_w$ changes in various manners, and therefore another constraint condition is added for selection of the design reference cone ($\beta_w$) The design method would differ depending on the selection of the constraint condition. One of the constraint conditions is the radius of curvature of the tooth trace in the Wildhaber (Gleason) method which is already described. In the present embodiment, $\beta_w$ is selected with a constraint condition that a line of intersection between the cone which contacts at $P_w$ and the surface of action coincides with the pitch generating line $L_{pw}$.

As described, there is no substantial difference caused by where on the path of contact $g_0$ the design reference point is selected. Therefore, a design method of a hypoid gear will be described in which the point of contact $P_w$ is set as the design reference point and circular cones which contact at $P_w$ are set as the pitch cones.

4.2A.1 Pitch Cone Angles

Figure 14:
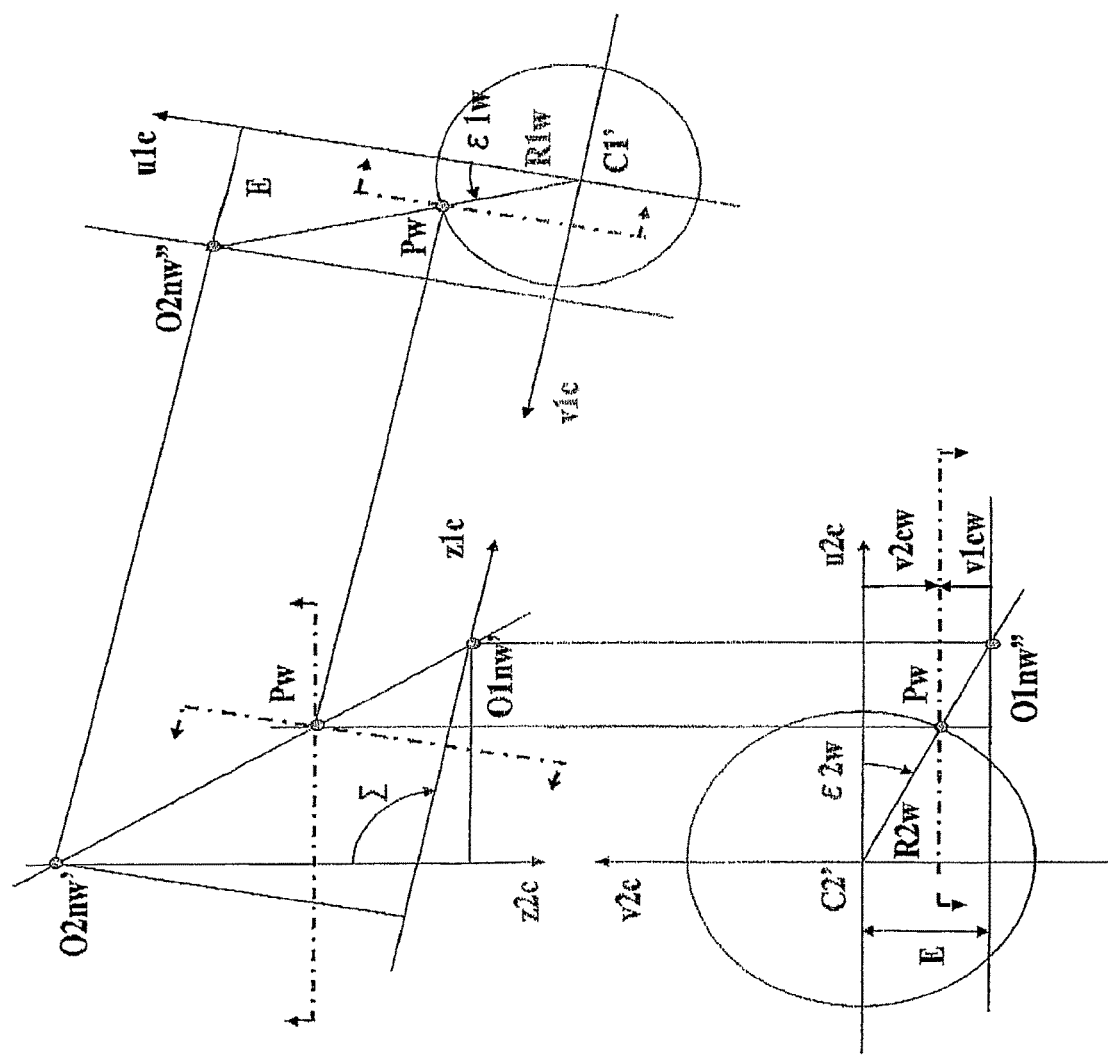
FIG. 14 is a diagram showing a relationship between a contact point $P_w$ and points $O_{1nw}$ and $O_{2nw}$.

Intersection points between a plane $S_{nw}$ normal to the relative velocity $V_{rsw}$ of the reference point $P_w$ and the gear axes are set as $O_{1nw}$ and $O_{2nw}$ (FIG. 9). FIG. 14 is a diagram showing FIG. 9 viewed from the positive directions of the tooth axes $z_{1c}$ and $z_{2c}$, and intersections $O_{1nw}$ and $O_{2nw}$ can be expressed by the following expressions.

$$O_{1nw}(0,0,-E/(\tan \varepsilon_{2w} \sin \Sigma):C_1)$$

$$O_{2nw}(0,0,-E/(\tan \varepsilon_{1w} \sin \Sigma):C_2)$$

where $\sin \varepsilon_{1w} = v_{1cw}/R_{1w}$ and $\sin \varepsilon_{2w} = v_{2cw}/R_{2w}$.

In addition, $O_{1nw}P_w$ and $O_{2nw}P_w$ can be expressed with the following expressions.

$$O_{1nw}P_w = \{R_{1w}^2 + (-E/(\tan \varepsilon_{2w} \sin \Sigma) - z_{1cw})^2\}^{1/2}$$

$$O_{2nw}P_w = \{R_{2w}^2 + (-E/(\tan \varepsilon_{1w} \sin \Sigma) - z_{2cw})^2\}^{1/2}$$

Therefore, the cone angles $\gamma_{pw}$ and $\Gamma_{gw}$ of the pinion and ring gear can be determined with the following expressions, taking advantage of the fact that $O_{1nw}P_w$ and $O_{2nw}P_w$ are back cone elements:

$$\cos \gamma_{pw} = R_{1w}/O_{1nw}P_w$$

$$\cos \Gamma_{gw} = R_{2w}/O_{2nw}P_w \tag{14}$$

The expression (14) sets the pitch cone angles of cones having radii of $R_{1w}$ and $R_{2w}$ and contacting at $P_w$.

4.2A.2 Inclination Angle of Relative Velocity at Reference Point $P_w$

The relative velocity and peripheral velocity areas follows.

$$V_{rsw}/\omega_{20} = \{(E \sin \Gamma_s)^2 + (r_w \sin \Sigma/\sin(\Sigma - \Gamma_s))^2\}^{1/2}$$

$$V_{1w}/\omega_{20} = i_0 R_{1w}$$

$$V_{2w}/\omega_{20} = R_{2w}$$

When a plane defined by peripheral velocities $V_{1w}$ and $V_{2w}$ is $S_{tw}$, the plane $S_{tw}$ is a pitch plane. If an angle formed by $V_{1w}$ and $V_{2w}$ is $\psi_{v12w}$ and an angle formed by $V_{rsw}$ and $V_{1w}$ is $\psi_{vrs1w}$ (FIG. 9), $$\cos(\psi_{v12w}) = (V_{1w}^2 + V_{2w}^2 - V_{rsw}^2)/(2V_{1w} \times V_{2w})$$

$$\cos(\psi_{vrs1w}) = (V_{rsw}^2 + V_{1w}^2 - V_{2w}^2)/(2V_{1w} \times V_{rsw})$$

If the intersections between the plane $S_{tw}$ and the pinion and gear axes are $O_{1w}$ and $O_{2w}$, the spiral angles of the pinion and the ring gear can be determined in the following manner as inclination angles on the plane $S_{tw}$ from $P_w O_{1w}$ and $P_w O_{2w}$ (FIG. 9).

$$\psi_{pw} = \pi/2 - \psi_{vrs1w}$$

$$\psi_{gw} = \pi/2 - \psi_{v12w} - \psi_{vrs1w} \tag{15}$$

When a pitch point $P_w(r_w, \beta_w, z_{cw}: C_s)$ is set, specifications of the cones contacting at $P_w$ and the inclination angle of the relative velocity $V_{rsw}$ can be determined based on expressions (13), (14) and (15). Therefore, conversely, the pitch point $P_w$ and the relative velocity $V_{rsw}$ can be determined by setting three variables (for example, $R_{2w}$, $\psi_{pw}$, $\Gamma_{gw}$) from among the cone specifications and the inclination angle of the relative velocity $V_{rsw}$. Each of these three variables may be any variable as long as the variable represents $P_w$, and the variables may be, in addition to those described above, for example, a combination of a ring gear reference radius $R_{2w}$, a ring gear spiral angle $\psi_{gw}$, and a gear pitch cone angle $\Gamma_{gw}$, or a combination of the pinion reference radius $R_{1w}$, the ring gear spiral angle $\psi_{pw}$, and $\Gamma_{gw}$.

4.2A.3 Tip Cone Angle

Normally, an addendum $a_G$ and an addendum angle $\alpha_G = a_G/O_{2w}P_w$ are determined and the tip cone angle is determined by $\Gamma_{gf} = \Gamma_s + \alpha_G$. Alternatively, another value may be arbitrarily chosen for the addendum angle $\alpha_G$.

4.2A.4 Inclination Angle of Normal $g_w$ at Reference Point $P_w$

Figure 15:
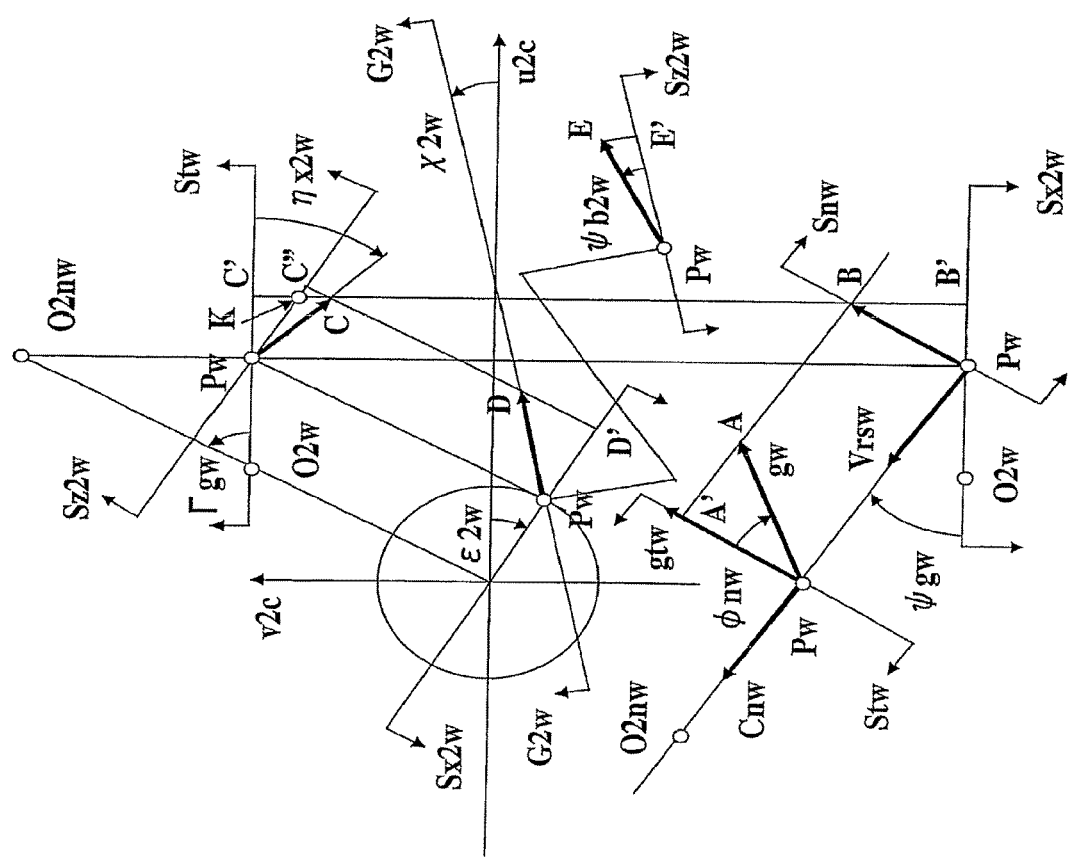
FIG. 15 is a diagram showing a contact point $P_w$ and a path of contact $g_w$ in planes $S_{tw}$, $S_{nw}$, and $G_{2w}$.

FIG. 15 shows the design reference point $P_w$ and the contact normal $g_w$ on planes $S_{tw}$, $S_{nw}$, and $G_{2w}$.

(1) Expression of Inclination Angle of $g_w$ in Coordinate System $C_s$

An intersection between $g_w$ passing through $P_w(u_{cw}, v_{cw}, z_{cw}: C_s)$ and the plane $S_H$ ($\beta_w = 0$) is set as $P_0(u_{c0}, 0, z_{c0}: C_s)$ and the inclination angle of $g_w$ is represented with reference to the point $P_0$ in the coordinate system $C_s$, by $g_w$ ($\psi_0$, $\varphi_{n0}$: $C_s$). The relationship between $P_0$ and $P_w$ is as follows (FIG. 11):

$$u_{c0} = u_{cw} + (v_{cw}/\cos \psi_0) \tan \varphi_{n0}$$

$$z_{c0} = z_{cw} - v_{cw} \tan \psi_0 \tag{16}$$

(2) Expression of Inclination Angle of $g_w$ on Pitch Plane $S_{tw}$ and Plane $S_{nw}$ (FIG. 9)

When a line of intersection between the plane $S_{nw}$ and the pitch plane $S_{tw}$ is $g_{tw}$, an inclination angle on the plane $S_{nW}$ from $g_{tw}$ is set as $\varphi_{nw}$. The inclination angle of $g_w$ is represented by $g_w(\psi_{gw}, \varphi_{nw})$ using the inclination angle $\psi_{gw}$ of $V_{rsw}$ from $P_w O_{2w}$ on the pitch plane $S_{tw}$ and $\varphi_{nw}$.

(3) Transformation Equation of Contact Normal $g_w$

In the following, transformation equations from $g_w(\psi_{gw}, \varphi_{nw})$ to $g_w(\psi_0, \varphi_{n0}: C_s)$ will be determined.

FIG. 15 shows $g_w(\psi_{gw}, \varphi_{nw})$ with $g_w(\varphi_{2w}, \psi_{b2w}: C_2)$. In FIG. 15, $g_w$ is set with $P_w A$, and projections of point A are sequentially shown with B, C, D, and E. In addition, the projection points to the target sections are shown with prime signs (') and double-prime signs ("). The lengths of the directed line segments are determined in the following manner, with $P_w A = L_g$:

$$A'A = L_g \sin\varphi_{nw} \tag{17}$$

$$B'B = L_g \cos\varphi_{nw}\cos\psi_{gw}$$

$$C'C = A'A$$

$$P_w C' = L_g \cos\varphi_{nw}\sin\psi_{gw}$$

$$C'K = P_w C'/\tan\Gamma_{gw}$$

$$C''C = C'C - C'K)\sin\Gamma_{gw}$$

$$\qquad L_g(\sin\varphi_{nw} - \cos\varphi_{nw}\sin\psi_{gw}/\tan\Gamma_{gw})\sin\Gamma_{gw}$$

$$D'D = B'B$$

$$P_w E = P_w A$$

$$E'E = C''C$$

$$\sin\psi_{b2w} = E'E/P_w E = C''C/L_g$$

$$\qquad = (\sin\varphi_{nw} - \cos\varphi_{nw}\sin\psi_{gw}/\tan\Gamma_{gw})\sin\Gamma_{gw}$$

-continued $$\tan\eta_{x2w} = C'C/P_wC' = \tan\varphi_{nw}/\sin\psi_{gw} \quad (18)$$

$$P_wC = (P_wC'^2 + C'C^2)^{1/2} = L_g \times \{(\cos\varphi_{nw}\sin\psi_{gw})^2 + (\sin\varphi_{nw})^2\}^{1/2}$$

$$P_wC'' = P_wC\cos\{\eta_{x2w} - (\pi/2 - \Gamma_{gw})\} = P_wC\sin(\eta_{xw2} + \Gamma_{gw})$$

$$\tan(\chi_{2w} - \varepsilon_{2w}) = D'D/P_wC''$$

$$= \cos\varphi_{nw}\cos\psi_{gw}/[\{(\cos\varphi_{nw}\sin\psi_{gw})^2 + (\sin\varphi_{nw})^2\}^{1/2} \times \sin(\eta_{x2w} + \Gamma_{gw})]$$

$$\varphi_{2w} = \pi/2 - \chi_{2w}$$

When $g_w(\varphi_{2w}, \psi_{b2w}: C_2)$ is transformed from the coordinate system $C_2$ to the coordinate system $C_s$, $g_w(\psi_0, \varphi_{n0}: C_3)$ can be represented as follows:

$$\sin\varphi_{n0} = \cos\psi_{b2w}\sin\Phi_{2w}\cos\Gamma_s + \sin\psi_{b2w}\sin\Gamma_s$$

$$\tan\psi_0 = \tan\varphi_{2w}\sin\Gamma_s - \tan\psi_{b2w}\cos\Gamma_s/\cos\varphi_{2w} \quad (19)$$

With the expressions (17), (18), and (19), $g_w(\psi_{gw}, \varphi_{nw})$ can be represented by $g_w(\psi_0, \varphi_{n0}: C_s)$.

4.2B Reference Point $P_w$, Based on $R_{2w}$, $\beta_w$, $\psi_{rw}$

As described above at the beginning of section 4.2A, the pitch cones of the pinion and the gear do not have to contact at the reference point $P_w$. In this section, a method is described in which the reference point $P_w$ is determined on the coordinate system $C_s$ without the use of the pitch cone, and by setting the gear reference radius $R_{2w}$, a phase angle $\beta_w$, and a spiral angle $\psi_{rw}$ of the reference point.

The reference point $P_w$ is set in the coordinate system $C_s$ as follows:

$$P_w(u_{cw}, v_{cw}, z_{cw}: C_s)$$

When $P_w$ is represented with the circle radius $r_w$ of the relative velocity, and an angle from the $u_c$ axis $\beta_w$, in a form of $P_w(r_w, \beta_w, z_{cw}: C_s)$, $$u_{cw} = r_w \cos\beta_w$$

$$v_{cw} = r_w \sin\beta_w$$

In addition, as the phase angle $\beta_w$ of the reference point and the spiral angle $\psi_{rw}$ are set based on expression (12) which represents a relationship between a radius $r_w$ around the instantaneous axis of the reference point $P_w$ and the inclination angle $\psi_{rw}$ of the relative velocity, $$r_w = E\tan\psi_{rw} \times \sin(\Sigma - \Gamma_s)\sin\Gamma_s/\sin\Sigma$$

$u_{cw}$ and $V_{cw}$ are determined accordingly.

Next, $P_w(u_{cw}, v_{cw}, z_{cw}: C_s)$ is converted to the coordinate system $C_2$ of rotation axis of the second gear. This is already described as expression (13).

$$u_{2cw} = -u_{cw}\cos\Gamma_s + z_{cw}\sin\Gamma_s$$

$$v_{2cw} = v_{cw} - v_{cs2}$$

$$z_{2cw} = -u_{cw}\sin\Gamma_s - z_{cw}\cos\Gamma_s \quad (13a)$$

Here, as described in section 4.1, $v_{cs2} = E\tan\Gamma_s/\{\tan(\Sigma-\Gamma_s) + \tan\Gamma_s\}$. In addition, there is an expression in expression (13) describing:

$$R_{2w}^2 = u_{2cw}^2 + v_{2cw}^2 \quad (13b)$$

Thus, by setting the gear reference radius $R_{2w}$, $z_{cw}$ is determined based on expressions (13a) and (13b), and the coordinate of the reference point $P_w$ in the coordinate system $C_s$ is calculated.

Once the design reference point $P_w$ is determined, the pinion reference circle radius $R_{1w}$ can also be calculated based on expression (13).

Because the pitch generating line $L_{pw}$ passing at the design reference point $P_w$ is determined, the pitch hyperboloid can be determined. Alternatively, it is also possible to determine a design reference cone in which the gear cone angle $\Gamma_{gw}$ is approximated to be a value around $\Gamma_S$, and the pinion cone angle $\gamma_{pw}$ is approximated by $\Sigma - \Gamma_{pw}$. Although the reference cones share the design reference point $P_w$, the reference cones are not in contact with each other. The tip cone angle can be determined similarly to as in section 4.2A.3.

A contact normal $g_w$ is set as $g_w(\psi_{rw}, \varphi_{nrw}; C_{rs})$ as shown in FIG. 10. The variable $\varphi_{nrw}$ represents an angle, on the plane $S_{nw}$, between an intersecting line between the plane $S_{nw}$ and the plane $S_{pw}$ and the contact normal $g_w$. The contact normal $g_w$ can be converted to $g_w(\psi_0, \varphi_{n0}; C_s)$ as will be described later. Because $\psi_{pw}$ and $\psi_{gw}$ can be determined based on expression (15), the contact normal $g_w$ can be set as $g_w(\psi_{pw}, \varphi_{nw}; S_{nw})$ similar to section 4.2A.4.

Conversion of the contact normal from the coordinate system $C_{rs}$ to the coordinate system $C_s$ will now be described.

(1) A contact normal $g_w(\psi_{pw}, \varphi_{nrw}; C_{rs})$ is set.

(2) When the displacement on the contact normal $g_w$ is $L_g$, the axial direction components of the displacement $L_g$ on the coordinate system $C_{rs}$ are:

$$L_{urs} = -L_g\sin\varphi_{nrw}$$

$$L_{vrs} = L_g\cos\varphi_{nrw}\cos\psi_{rw}$$

$$L_{zrs} = L_g\cos\varphi_{nrw}\sin\psi_{rw}$$

(3) The axial direction components of the coordinate system $C_s$ are represented with $(L_{urs}, L_{vrs}, L_{zrs})$ as:

$$L_{uc} = L_{urs}\cos\beta_w - L_{vrs}\sin\beta_w$$

$$L_{vc} = L_{urs}\sin\beta_w + L_{vrs}\cos\beta_w$$

$$L_{zc} = L_{zrs}$$

(4) Based on these expressions, $$L_{uc} = -(L_g\sin\varphi_{nrw})\cos\beta_w - (L_g\cos\varphi_{nrw}\cdot\cos\psi_{rw})\sin\beta_w$$
$$= -L_g(\sin\varphi_{nrw}\cdot\cos\beta_w + \cos\varphi_{nrw}\cdot\cos\psi_{rw}\cdot\sin\beta_w)$$

$$L_{vc} = -(L_g\sin\varphi_{nrw})\sin\beta_w + (L_g\cos\varphi_{nrw}\cdot\cos\psi_{rw})\cos\beta_w$$
$$= L_g(-\sin\varphi_{nrw}\cdot\sin\beta_w + \cos\varphi_{nrw}\cdot\cos\psi_{rw}\cdot\cos\beta_w)$$

(5) From FIG. 6, the contact normal $g_w(\Phi_0, \varphi_{n0}; C_s)$ is:

$$\tan\psi_0 = L_{zc}/L_{vc}$$
$$= \cos\varphi_{nrw}\cdot\sin\psi_{rw}/(-\sin\varphi_{rw}\cdot\sin\beta_w + \cos\varphi_{nrw}\cdot\cos\psi_{rw}\cdot\cos\beta_w)$$

$$\sin\varphi_{n0} = -L_{uc}/L_g$$
$$= \sin\varphi_{nrw}\cdot\cos\beta_w + \cos\varphi_{nrw}\cdot\cos\psi_{rw}\cdot\sin\beta_w$$

(6) From FIG. 11, the contact normal $g_w(\varphi_{s0}, \psi_{sw0}; C_s)$ is:

$$\tan\varphi_{s0} = -L_{uc}/L_{vc} = (\sin\varphi_{nrw}\cdot\cos\beta_w + \cos\varphi_{nrw}\cdot\cos\psi_{rw}\cdot\sin\beta_w)/(-\sin\varphi_{rw}\cdot\sin\beta_w + \cos\varphi_{nrw}\cdot\cos\psi_{rw}\cdot\cos\beta_w)$$

$$\sin\psi_{sw0} = L_{zc}/L_g = \cos\varphi_{nrw}\cdot\cos\psi_{rw}$$

The simplest practical method is a method in which the design reference point $P_w$ is determined with $\beta_w$ set as $\beta_w = 0$, and reference cones are selected in which the gear cone angle is around $\Gamma_{gw}=\Gamma_s$ and the pinion cone angle is around $\gamma_{pw}=\Sigma-\Gamma_{gw}$. In this method, because $\beta_w=0$, the contact normal $g_w$ is directly set as $g_w(\psi_0, \varphi_{n0}; C_s)$.

4.3 Tooth Trace Contact Ratio

4.3.1 General Equation of Tooth Trace Contact Ratio

An contact ratio $m_f$ along $L_{pw}$ and an contact ratio $m_{fcone}$ along a direction of a line of intersection ($P_w P_{gcone}$ in FIG. 13) between an arbitrary cone surface and $S_{w0}$ are calculated with an arbitrary point $P_w$ on $g_w=g_0$ as a reference. The other contact ratios $m_z$ and $m_s$ are similarly determined.

Because the contact normal $g_w$ is represented in the coordinate system $C_s$ with $g_w=g_0(\psi_0, \varphi_{n0}; C_s)$, the point $P_w(u_{2cw}, v_{2cw}, z_{2cw}; C_2)$ represented in the coordinate system $C_2$ is converted into the point $P_w(q_{2cw}, -R_{b2w}, z_{2cw}; C_{q2})$ on the coordinate system $C_{q2}$ in the following manner:

$$q_{2cw} = u_{2cw}\cos\chi_{20} + v_{2cw}\sin\chi_{20} \qquad (20)$$

$$R_{b2w} = u_{2cw}\sin\chi_{20} - v_{2cw}\cos\chi_{20}$$

$$= R_{2w}\cos(\varphi_{20} + \varepsilon_{2w})$$

$$\chi_{20} = \pi/2 - \varphi_{20}$$

$$\tan\varepsilon_{2w} = v_{2cw}/u_{2cw}$$

$$R_{2w} = (u_{2cw}^2 + v_{2cw}^2)^{1/2}$$

The inclination angle $g_0(\varphi_{20}, \psi_{b20}; C_2)$ of the contact normal $g_w=g_0$, the inclination angle $\varphi_{s0}$ of the surface of action $S_{w0}$, and the inclination angle $\psi_{sw0}$ of $g_0$ ($=P_0 P_{Gswn}$) on $S_{w0}$ (FIGS. 12 and 13) are determined in the following manner:

(a) For Cylindrical Gears, Crossed Helical Gears, and Worm Gears $$\tan\varphi_{20}=\tan\varphi_{n0}\cos(\Gamma_s-\psi_0)$$

$$\sin\psi_{b20}=\sin\varphi_{n0}\sin(\Gamma_s-\psi_0)$$

$$\tan\varphi_{s0}=\tan\varphi_{n0}\cos\psi_0$$

$$\tan\psi_{sw0}=\tan\psi_0\sin\varphi_{s0}$$

$$\text{or } \sin\psi_{sw0}=\sin\varphi_{n0}\sin\psi_0 \qquad (20a)$$

(b) For Bevel Gears and Hypoid Gears $$\tan\varphi_{20}=\tan\varphi_{n0}\cos\Gamma_s/\cos\psi_0+\tan\psi_0\sin\Gamma_s$$

$$\sin\psi_{b20}=\sin\varphi_{n0}\sin\Gamma_s-\cos\psi_{n0}\sin\psi_0\cos\Gamma_s$$

$$\tan\varphi_{s0}=\tan\varphi_{n0}/\cos\psi_0$$

$$\tan\psi_{sw0}=\tan\psi_0\cos\varphi_{s0} \qquad (20b)$$

The derivation of $\varphi_{s0}$ and $\psi_{sw0}$ are detailed in, for example, Papers of Japan Society of Mechanical Engineers, Part C, Vol. 70, No. 692, c2004-4, Third Report of Design Theory of Power Transmission Gears.

In the following, a calculation is described in the case where the path of contact coincides with the contact normal $g_w=g_0$. If it is assumed that with every rotation of one pitch $P_w$ moves to $P_g$, and the tangential plane W translates to $W_g$, the movement distance $P_w P_g$ can be represented as follows (FIG. 11):

$$P_w P_g=P_{gw}=R_{b2w}(2\theta_{2p})\cos\psi_{b20} \qquad (21)$$

where $P_{gw}$ represents one pitch on $g_0$ and $2\theta_{2p}$ represents an angular pitch of the ring gear.

When the intersection between $L_{pw}$ and $W_g$ is $P_{1w}$, one pitch $P_{fw}=P_{1w}P_w$ on the tooth trace $L_{pw}$ is:

$$P_{fw}=P_{gw}/\sin\psi_{sw0} \qquad (22)$$

The relationship between the internal and external circle radii of the ring gear and the face width of the ring gear is:

$$R_{2t}=R_{2h}-F_g/\sin\Gamma_{gw}$$

where $R_{2t}$ and $R_{2h}$ represent internal and external circle radii of the ring gear, respectively, $F_g$ represents a gear face width on the pitch cone element, and $\Gamma_{gw}$ represents a pitch cone angle.

Because the effective length $F_{1wp}$ of the tooth trace is a length of the pitch generating line $L_{pw}$ which is cut by the internal and external circles of the ring gear:

$$F_{1wp}=\{(R_{2h}^2-v_{2pw}^2)^{1/2}-(R_{2t}^2-v_{2pw}^2)^{1/2}\}/\sin\Gamma_s \qquad (23)$$

Therefore, the general equation for the tooth trace contact ratio $m_f$ would be:

$$m_f=F_{1wp}/P_{fw} \qquad (24)$$

4.3.2 for Cylindrical Gear (FIG. 12)

The pitch generating line $L_{pw}$ coincides with the instantaneous axis ($\Gamma_s=0$), and $P_w$ may be anywhere on $L_{pw}$. Normally, $P_w$ is taken at the origin of the coordinate system $C_s$, and, thus, $P_w(u_{cw}, v_{cw}, z_{cw}; C_s)$ and the contact normal $g_w=g_0(\psi_0, \varphi_{n0}; C_s)$ can be simplified as follows, based on expressions (20) and (20a):

$$P_w(0,0,0;C_s), P_w(0,-v_{cs2},0;C_2)$$

$$P_0(q_{2pw}=-v_{cs2}\sin\chi_{20}, -R_{b2w}=-v_{cs2}\cos\chi_{20}, 0; C_{q2})$$

$$\varphi_{20}=\varphi_{s0}, \psi_{b20}=-\psi_{sw0}$$

$$\tan\psi_{b20}=-\tan\psi_{sw0}=-\tan\psi_0\sin\varphi_{20}$$

In other words, the plane $S_{w0}$ and the plane of action $G_{20}$ coincide with each other. It should be noted, however, that the planes are viewed from opposite directions from each other.

These values can be substituted into expressions (21) and (22) to determine the tooth trace contact ratio $m_f$ with the tooth trace direction pitch $P_{fw}$ and expression (24):

$$P_{gw} = R_{b2w}(2\theta_{2p})\cos\psi_{b20} \qquad (25)$$

$$P_{fw} = |P_{gw}/\sin\psi_{sw0}| = |R_{2w}(2\theta_{2p})/\tan\psi_{b20}|$$

$$m_f = F_{1wp}/P_{fw} = F\tan\psi_0/R_{2w}(2\theta_{2p})$$

$$= F\tan\psi_0/p$$

where $R_{2w}=R_{b2w}/\sin\varphi_{20}$ represents a radius of a ring gear reference cylinder, $p=R_{2w}(2\theta_{2p})$ represents a circular pitch, and $F=F_{1wp}$ represents the effective face width.

The expression (25) is a calculation equation of the tooth trace contact ratio of the cylindrical gear of the related art, which is determined with only p, F, and $\psi_0$ and which does not depend on $\varphi_{n0}$. This is a special case, which is only true when $\Gamma_s=0$, and the plane $S_{w0}$ and the plane of action $G_{20}$ coincide with each other.

4.3.3 for Bevel Gears and Hypoid Gears

For the bevel gears and the hypoid gears, the plane $S_{w0}$ does not coincide with $G_{20}$ ($S_{w0}\neq G_{20}$), and thus the tooth trace contact ratio $m_f$ depends on $\varphi_{n0}$, and would differ between the drive-side and the coast-side. Therefore, the tooth trace contact ratio $m_f$ of the bevel gear or the hypoid gear cannot be determined with the currently used expression (25). In order to check the cases where the currently used expression (25) can hold, the following conditions (a), (b), and (c) are assumed:

(a) the gear is a bevel gear; therefore, the pitch generating line $L_{pw}$ coincides with the instantaneous axis and the design reference point is $P_w(0, 0, z_{cw}: C_s)$;

(b) the gear is a crown gear; therefore, $\Gamma_s = \pi/2$; and (c) the path of contact is on the pitch plane; therefore, $\varphi_{n0} = 0$.

The expressions (20), and (20b)-(24) can be transformed to yield:

$$\varphi_{20} = \psi_0, \psi_{b20} = 0, \varphi_{s0} = 0, \psi_{sw0} = \psi_0$$

$$R_{b2w} = R_{2w} \cos \varphi_{20} = R_{2w} \cos \psi_0$$

$$P_{gw} = R_{b2w}(2\theta_{2p})\cos \psi_{b20} = R_{2w}(2\theta_{2p})\cos \psi_0$$

$$P_{fw} = |P_{gw}/\sin \psi_{sw0}| = |R_{2w}(2\theta_{2p})/\tan \psi_0|$$

$$m_f = F_{1wp}/P_{fw} = F \tan \psi_0/R_{2w}(2\theta_{2p}) = F \tan \psi_0/p \quad (26)$$

The expression (26) is identical to expression (25). In other words, the currently used expression (25) holds in bevel gears which satisfy the above-described conditions (a), (b), and (c). Therefore, (1) strictly, the expression cannot be applied to normal bevel gears having $\Gamma_s$ different from $\pi/2$ ($\Gamma_s \neq \pi/2$) and $\varphi_{n0}$ different from 0 ($\varphi_{n0} \neq 0$); and (2) in a hypoid gear ($E \neq 0$), the crown gear does not exist and $\varepsilon_{2w}$ differs from 0 ($\varepsilon_{2w} \neq 0$).

For these reasons, the tooth trace contact ratios of general bevel gears and hypoid gears must be determined with the general expression (24), not the expression (26).

4.4 Calculation Method of Contact Ratio $m_{fcone}$ Along Line of Intersection of Gear Pitch Cone and Surface of Action $S_{w0}$ The tooth trace contact ratios of the hypoid gear (Gleason method) is calculated based on the expression (26), with an assumption of a virtual spiral bevel gear of $\psi_0 = (\psi_{pw} + \psi_{gw})/2$ (FIG. 9), and this value is assumed to be sufficiently practical. However, there is no theoretical basis for this assumption. In reality, because the line of intersection of the gear pitch cone and the tooth surface is assumed to be the tooth trace curve, the contact ratio is more properly calculated along the line of intersection of the gear pitch cone and the surface of action $S_{w0}$ in the static coordinate system. In the following, the contact ratio $m_{fcone}$ of the hypoid gear is calculated from this viewpoint.

FIG. 13 shows a line of intersection $P_w P_{gcone}$ with an arbitrary cone surface which passes through $P_w$ on the surface of action $S_{w0}$. Because $P_w P_{gcone}$ is a cone curve, it is not a straight line in a strict sense, but $P_w P_{gcone}$ is assumed to be a straight line here because the difference is small. When the line of intersection between the surface of action $S_{w0}$ and the plane $v_{2c} = 0$ is $P_{ssw} P_{gswn}$, the line of intersection $P_{ssw} P_{gswn}$ and an arbitrary cone surface passing through $P_w$ have an intersection $P_{gcone}$, which is expressed in the following manner:

$$P_{gcone}(u_{cgcone}, v_{cs2}, z_{cgcone}: C_s)$$

$$P_{gcone}(u_{2cgcone}, 0, z_{c2gcone}: C_2)$$

where $$u_{cgcone} = u_{cw} + (v_{cw} - v_{cs2})\tan \varphi_{s0}$$

$$z_{cgcone} = \{(v_{cs2} - v_{cw})/\cos \varphi_{s0}\} \tan \psi_{gcone} + z_{cw}$$

$$u_{2cgcone} = -u_{cgcone} \cos \Gamma_s + z_{cgcone} \sin \Gamma_s$$

$$z_{2cgcone} = -u_{cgcone} \sin \Gamma_s - z_{cgcone} \cos \Gamma_s$$

$\psi_{gcone}$ represents an inclination angle of $P_w P_{gcone}$ from $P_0 P_{ssw}$ on $S_{w0}$.

Because $P_{gcone}$ is a point on a cone surface of a cone angle $\Gamma_{gcone}$ passing through $P_w$, the following relationship holds.

$$u_{2cgcone} - R_{2w} = -(z_{2cgcone} - z_{2cw})\tan \Gamma_{gcone} \quad (27)$$

When a cone angle $\Gamma_{gcone}$ is set, $\psi_{gcone}$ can be determined through expression (27). Therefore, one pitch $P_{cone}$ along $P_w P_{gcone}$ is:

$$P_{cone} = P_{gw}/\cos(\psi_{gcone} - \psi_{sw0}) \quad (28)$$

The contact length $F_{1wpcone}$ along $P_w P_{gcone}$ can be determined in the following manner.

In FIG. 11, if an intersection between $P_w P_{gcone}$ and $L_{pw0}$ is $P_{ws}(u_{cws}, 0, z_{cws}: C_s)$ $$u_{cws} = u_{cw} + v_{cw} \tan \varphi_{s0}$$

$$z_{cws} = z_{cw} - (v_{cw}/\cos \varphi_{s0})\tan \psi_{gcone}$$

If an arbitrary point on the straight line $P_w P_{gcone}$ is set as $Q(u_{cq}, v_{cq}, z_{cq}: C_s)$ (FIG. 11), $u_{cq}$ and $v_{cq}$ can be represented as functions of $z_{cq}$:

$$v_{cq} = \{(z_{cq} - z_{cws})/\tan \psi_{gcone}\} \cos \varphi_{s0}$$

$$u_{cq} = u_{cws} - v_{cq} \tan \varphi_{s0}$$

If the point Q is represented in the coordinate system $C_2$ using expression (13), to result in $Q(u_{2cq}, v_{2cq}, z_{2cq}: C_2)$, the radius $R_{2cq}$ of the point Q is:

$$u_{2cq} = -u_{cq} \cos \Gamma_s + z_{cq} \sin \Gamma_s$$

$$v_{2cq} = v_{cq} - v_{cs2}$$

$$R_{2cq} = \sqrt{(u_{2cq}^2 + v_{2cq}^2)}$$

If the values of $z_{cq}$ where $R_{2cq} = R_{2h}$ and $R_{2cq} = R_{2t}$ are $z_{cqh}$ and $z_{cqt}$, the contact length $F_{1wpcone}$ is:

$$F_{1wpcone} = (z_{cqh} - z_{cqt})/\sin \psi_{gcone} \quad (29)$$

Therefore, the contact ratio $m_{fcone}$ along $P_w P_{gcone}$ is:

$$m_{fcone} = F_{1wpcone}/P_{cone} \quad (30)$$

The value of $m_{fcone}$ where $\psi_{gcone} \to \pi/2$ (expression (30)) is the tooth trace contact ratio $m_f$ (expression (24))

5. Examples

Table 1 shows specifications of a hypoid gear designed through the Gleason method. The pitch cone is selected such that the radius of curvature of the tooth trace=cutter radius $R_c = 3.75''$. In the following, according to the above-described method, the appropriateness of the present embodiment will be shown with a test result by:

(1) first, designing a hypoid gear having the same pitch cone and the same contact normal as Gleason's and calculating the contact ratio $m_{fcone}$ in the direction of the line of intersection of the pitch cone and the surface of action, and (2) then, designing a hypoid gear with the same ring gear reference circle radius $R_{2w}$, the same pinion spiral angle $\psi_{pw}$, and the same inclination angle $\varphi_{nw}$ of the contact normal, in which the tooth trace contact ratio on the drive-side and the coast-side are approximately equal to each other.

5.1 Uniform Coordinate Systems $C_s$, $C_1$, and $C_2$, Reference Point $P_w$ and Pitch Generating Line $L_{pw}$ When values of a shaft angle $\Sigma = 90°$, an offset $E = 28$ mm, and a gear ratio $i_0 = 47/19$ are set, the intersection $C_s$ between the instantaneous axis and the line of centers and the inclination angle $\Gamma_s$ of the instantaneous axis are determined in the following manner with respect to the coordinate systems $C_1$ and $C_2$:

$$C_s(0, 24.067, 0: C_2), C_s(0, -3.993, 0: C_1), \Gamma_s = 67.989°$$

Based on Table 1, when values of a ring gear reference circle radius $R_{2w}$=89.255 mm, a pinion spiral angle $\psi_{pw}$=46.988°, and a ring gear pitch cone angle $\Gamma_{gw}$=62.784° are set, the system of equations based on expressions (13), (14), and (15) would have a solution:

$r_w$=9.536 mm,$\beta_w$=11.10°,$z_{cw}$=97.021

Therefore, the pitch point $P_w$ is:

$P_w(9.358,1.836,97.021:C_s)$

The pitch generating line $L_{pw}$ is determined on the coordinate system $C_s$ as a straight line passing through the reference point $P_w$ and parallel to the instantaneous axis ($\Gamma_s$=67.989°).

In the following calculations, the internal and external circle radii of the ring gear, $R_{2i}$=73.87 and $R_{2h}$=105 are set to be constants.

5.2 Contact Ratio $m_{fconeD}$ of Tooth Surface D (Represented with Index of D) with Contact Normal $g_{wD}$ Based on Table 1, when $g_{wD}$ is set with $g_{wD}(\psi_{gw}$=30.859°, $\varphi_{nwD}$=150), $g_{wD}$ can be converted into coordinate systems $C_s$ and $C_2$ with expressions (17), (18), and (19), to yield:

$g_{wD}(\varphi_{20D}$=48.410°,$\psi_{b20D}$=0.20°:$C_2$)

$g_{wD}(\psi_{0D}$=46.19°,$\varphi_{nD}$=16.48°:$C_s$)

The surface of action $S_{wD}$ can be determined on the coordinate system $C_s$ by the pitch generating line $L_{pw}$ and $g_{wD}$. In addition, the intersection $P_{Od}$ between $g_{wD}$ and the plane $S_H$ and the radius $R_{20D}$ around the gear axis are, based on expression (16):

$P_{0D}(10.142,0,95.107:C_s)$,$R_{20D}$=87.739 mm

The contact ratio $m_{fconeD}$ in the direction of the line of intersection between the pitch cone and the surface of action is determined in the following manner.

The inclination angle $\varphi_{sOD}$ of the surface of action $S_{wD}$, the inclination angle $\psi_{swOD}$ of $g_{wD}$ on $S_{wD}$, and one pitch $P_{gWD}$ on $g_{wD}$ are determined, based on expressions (20), (20b), and (21), as:

$\varphi_{sOD}$=23.13°,$\psi_{swOD}$=43.79°,$P_{gwD}$=9.894

(1) When $\Gamma_{gw}$=$\Gamma_{gcone}$=62.784° is set, based on expressions (27)-(30), $\psi_{gcone63D}$=74.98°,$P_{cone63D}$=20.56, $F_{1wpcone63D}$=34.98,$m_{fcone63D}$=1.701.

(2) When $\Gamma_{gcone}$=$\Gamma_s$=67.989° is set, similarly, $g_{cone68D}$=-89.99°,$P_{cone68D}$=14.30, $F_{1wpcone68D}$=34.70,$m_{fcone68D}$=2.427.

(3) When $F_{gcone}$=72.0° is set, similarly, $\psi_{gcone72D}$=78.88°,$P_{cone72D}$=12.09, $F_{1wpcone72D}$=36.15,$m_{fcone72D}$=2.989.

5.3 Contact Ratio $m_{fconeC}$ of Tooth Surface C (Represented with Index C) with Contact Normal $g_{wC}$ When $g_{wC}(\psi_{gw}$=30.859θ, $\varphi_{nw}$=-27.5°) is set, similar to the tooth surface D, $g_{wC}(\varphi_{20C}$=28.68°,$\psi_{b20C}$=-38.22°:$C_2$)

$g_{wC}(\psi_{0C}$=40.15°,$\varphi_{n0C}$=-25.61°:$C_s$)

$P_{0C}(8.206,0,95.473:C_s)$,$R_{20C}$=88.763 mm

The inclination angle $\varphi_{sOC}$ of the surface of action $S_{wC}$, the inclination angle $\psi_{swOC}$ of $g_{wC}$ on $S_{wc}$, and one pitch $P_{gwC}$ on $g_{wC}$ are, based on expressions (20), (20b), and (21):

$\varphi_{sOC}$=-32.10°,$\psi_{swOC}$=35.55°,$P_{gwC}$=9.086

(1) When $\Gamma_{gw}$=$\Gamma_{gcone}$=62.784° is set, based on expressions (27)-(30), $\psi_{gcone63C}$=81.08°,$P_{cone63C}$=12.971, $F_{1wpcone63C}$=37.86,$m_{fcone63C}$=2.919.

(2) When $\Gamma_{gcone}$=$\Gamma_s$=67.989° is set, similarly, $\psi_{gcone68C}$=-89.99°,$P_{cone68C}$=15.628, $F_{1wpcone68C}$=34.70,$m_{fcone68C}$=2.220.

(3) When $\Gamma_{gcone}$=72° is set, similarly, $\psi_{gcone72C}$=-82.92°,$P_{cone72C}$=19.061, $F_{1wpcone72C}$=33.09,$m_{fcone72C}$=1.736.

According to the Gleason design method, because $\Gamma_{gw}$=$\Gamma_{gcone}$=62.784°, the contact ratio along the line of intersection between the pitch cone and the surface of action are $m_{fcone63D}$=1.70 and $m_{fcone63C}$=2.92, which is very disadvantageous for the tooth surface D. This calculation result can be considered to be explaining the test result of FIG. 16.

Figure 17:
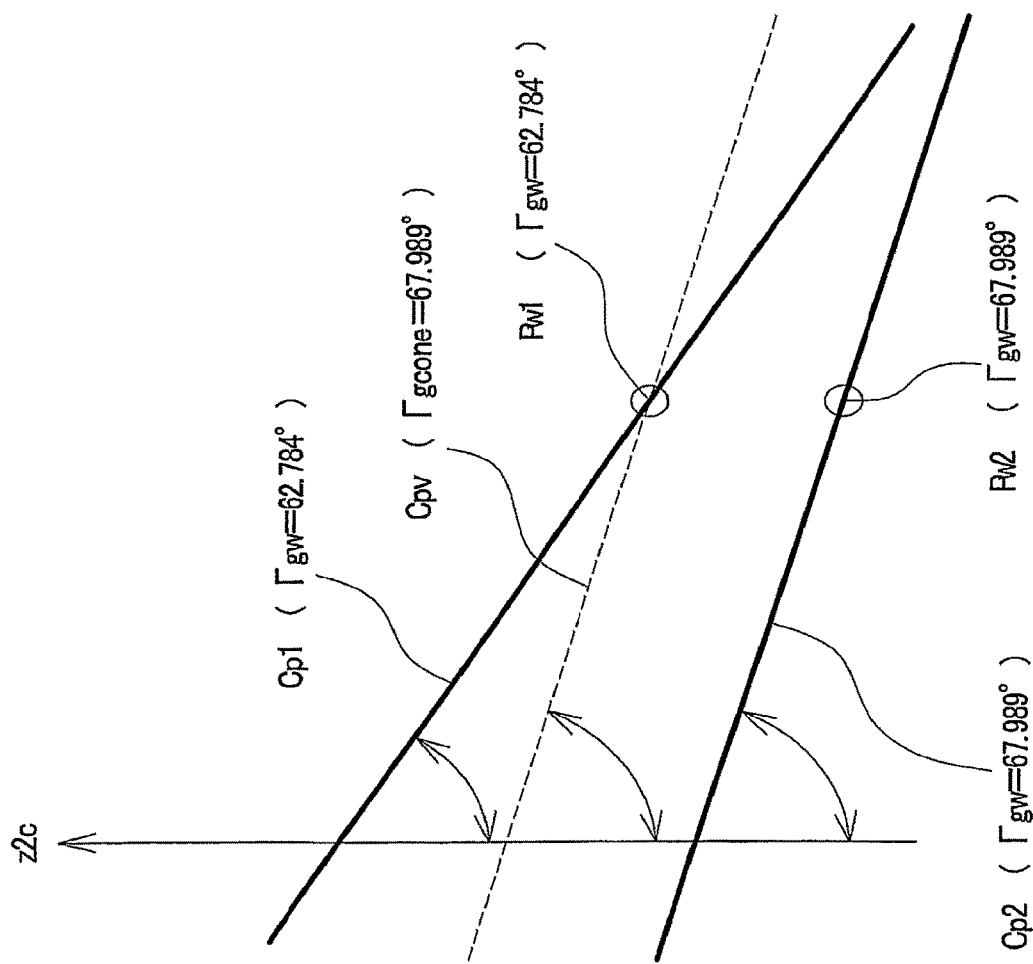
FIG. 17 is an explanatory diagram of a virtual pitch cone.

In addition, when the ring gear cone angle $\Gamma_{gcone}$=s=67.989°, $\psi_{gcone}$=-89.99° in both the drive-side and the coast-side. Thus, the line of intersection between the cone surface and the surface of action coincides with the pitch generating line $L_{pw}$, the tooth trace contact ratio of the present invention is achieved, and the contact ratio is approximately equal between the drive-side and the coast-side. Because of this, as shown in FIG. 17, a virtual pitch cone $C_{pv}$ passing through a reference point $P_w$ determined on the pitch cone angle of $\Gamma_{gw}$=62.784° and having the cone angle of $P_{gcone}$=67.989° and a pinion virtual cone (not shown) having the cone angle $\gamma_{pcone}$=$\Sigma$-$\Gamma_{gcone}$=22.02° can be defined, and the addendum, addendum angle, dedendum, and dedendum angle of the hypoid gear can be determined according to the following standard expressions of gear design, with reference to the virtual pitch cone. In the gear determined as described above, the tooth trace contact ratio of the present embodiment can be realized along the virtual pitch cone angle.

$$\alpha_g = \Sigma\delta_t \times a_g/(a_g+a_p) \tag{31}$$

$$a_g+a_p=h_k \text{ (action tooth size)} \tag{32}$$

where $\Sigma\delta_t$ represents a sum of the ring gear addendum angle and the ring gear dedendum angle (which changes depending on the tapered tooth depth), $a_g$ represents the ring gear addendum angle, $a_g$ represents the ring gear addendum, and $a_p$ represents the pinion addendum.

The virtual pitch cones $C_{1v}$ of the ring gear and the pinion defined here do not contact each other, although the cones pass through the reference point $P_{w1}$.

Figure 18:
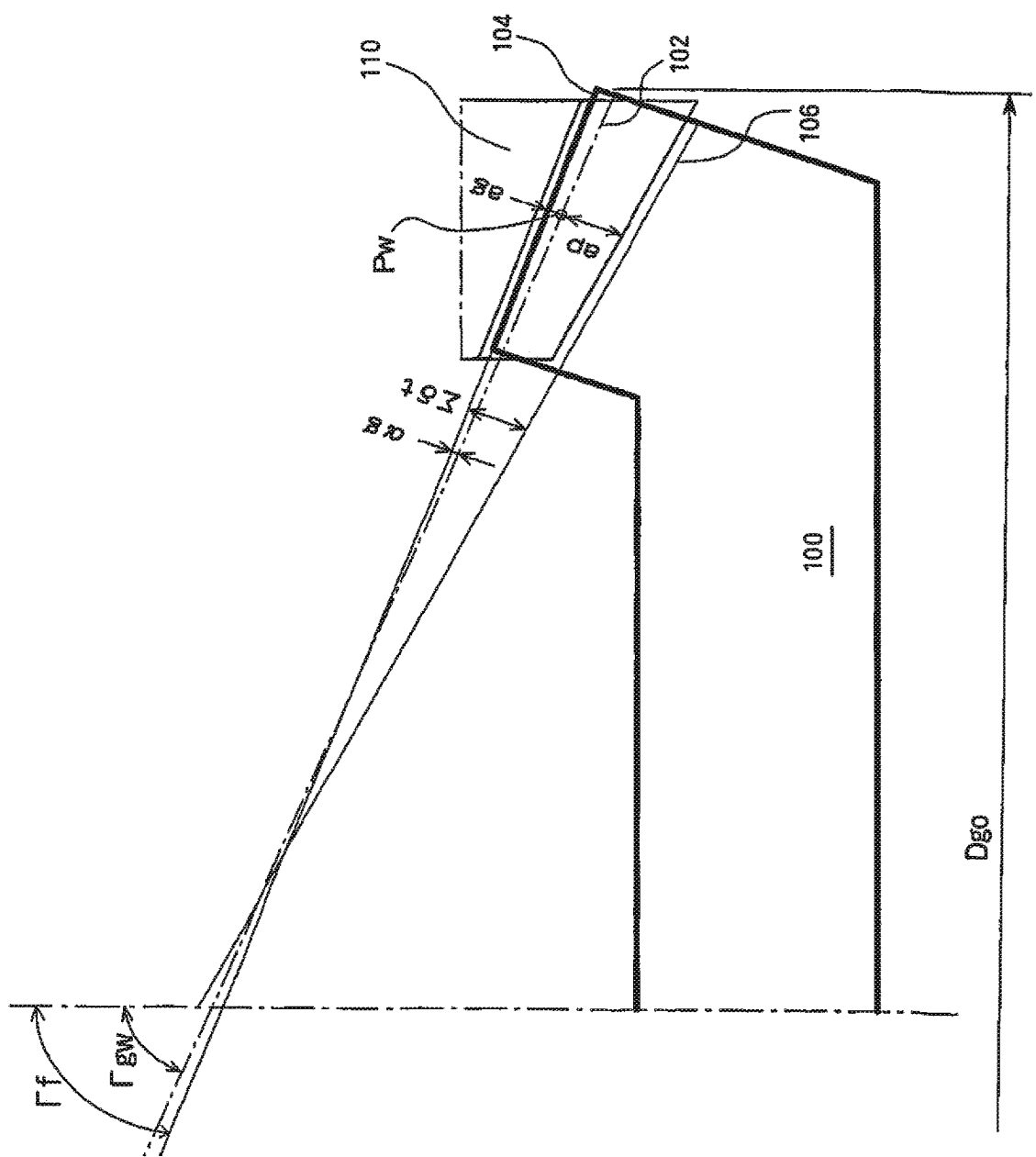
FIG. 18 is a diagram showing a definition of a ring gear shape.
Figure 19:
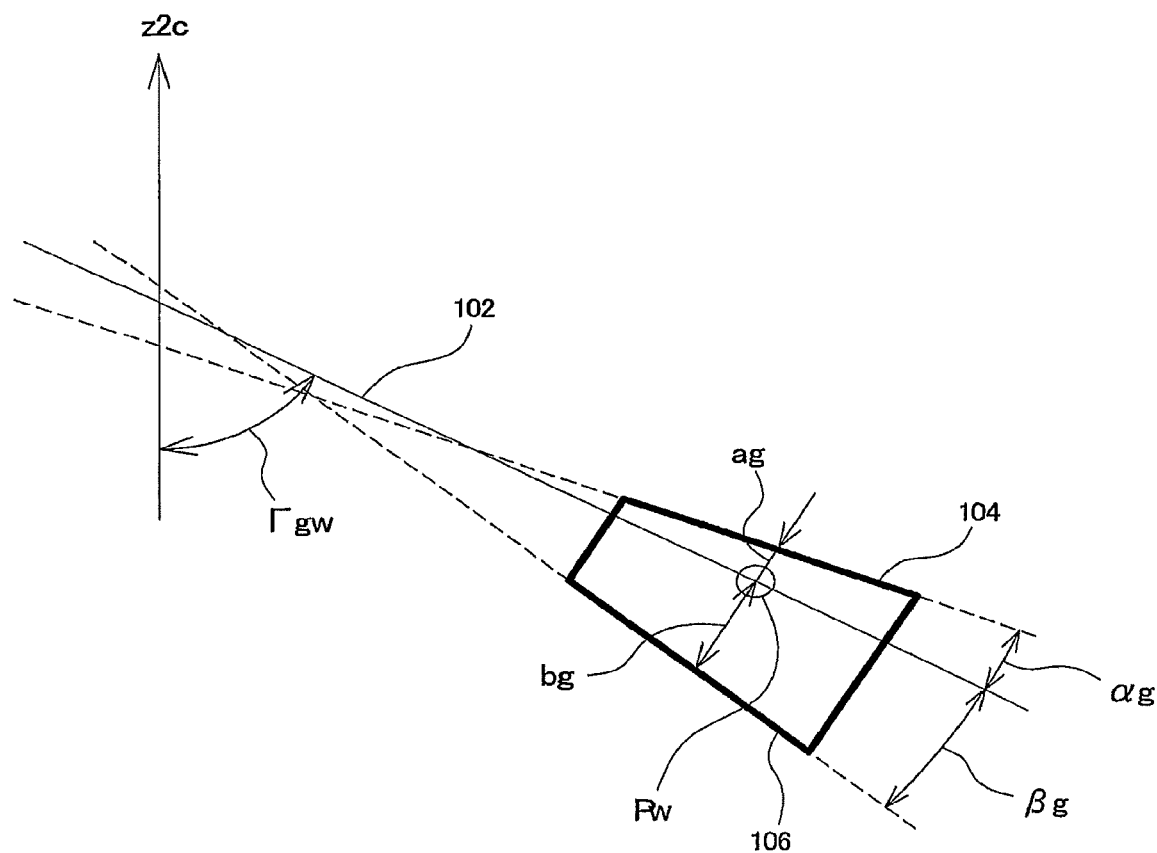
FIG. 19 is a diagram showing a definition of a ring gear shape.

The addendum and the addendum angle are defined as shown in FIGS. 18 and 19. More specifically, the addendum angle $\alpha_g$ of a ring gear 100 is a difference between cone angles of a pitch cone 102 and a cone 104 generated by the tooth tip of the ring gear, and the dedendum angle $\beta_g$ is similarly a difference between cone angles of the pitch cone 102 and a cone 106 generated by the tooth root of the ring gear. An addendum $a_g$ of the ring gear 100 is a distance between the design reference point $P_w$ and the gear tooth tip 104 on a straight line which passes through the design reference point $P_w$ and which is orthogonal to the pitch cone 102, and the dedendum $b_g$ is similarly a distance between the design reference point $P_w$ and the tooth root 106 on the above-described straight line. Similar definitions apply for a pinion 110.

By changing the pitch cone angle such that, for example, $\Gamma_{gw}$=72°>$\Gamma_s$, it is possible to design the tooth trace contact ratio to be larger on the tooth surface D and smaller on the tooth surface C. Conversely, by changing the pitch cone angle such that, for example, $\Gamma_{gw}=62.784°<\Gamma_s$, the tooth trace contact ratio would be smaller on the tooth surface D and larger on the tooth surface C.

A design method by the virtual pitch cone $C_{pv}$ will now be additionally described. FIG. 17 shows a pitch cone $C_{p1}$ having a cone angle $\Gamma_{gw}=62.784°$ according to the Gleason design method and the design reference point $P_{w1}$. As described above, in the Gleason design method, the drive-side tooth surface is disadvantageous in view of the contact ratio. When, on the other hand, the gear is designed with a pitch cone $C_{p2}$ having a cone angle $\Gamma_{gw}=67.989°$, the contact ratio can be improved. The design reference point $P_{w2}$ in this case is a point of contact between the pitch cones of the ring gear and the pinion. In other words, the design reference point is changed from the reference point $P_{w1}$ determined based on the Gleason design method to the reference point $P_{w2}$ so that the design reference point is at the point of contact between pitch cones of the ring gear and the pinion.

As already described, if the surface of action intersects the cone surface having the cone angle of $\Gamma_{gw}=67.989°$ over the entire face width, the above-described tooth trace contact ratio can be realized. In other words, in FIG. 17, when the element of the cone (virtual pitch cone) passing through the design reference point $P_{w1}$ and having the cone angle of 67.989° exists in the gear tooth surface in the face width of the ring gear, the above-described contact ratio can be realized. In order to realize this, a method may be considered in which the addendum angle and the dedendum angle are changed according to the current method. However, this method cannot be realized due to the following reason.

Figure 20:
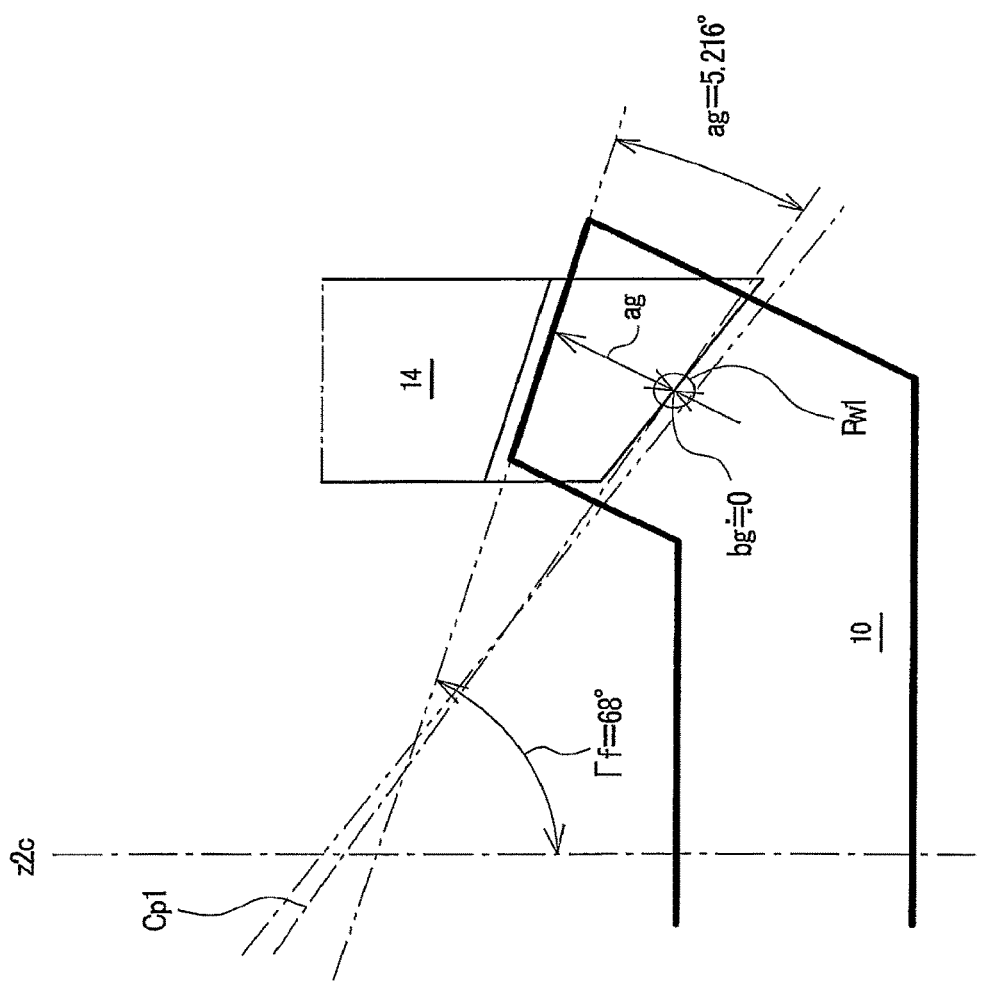
FIG. 20 is a diagram showing a state in which an addendum is extended and a tip cone angle is changed.

In order for the cone surface having the cone angle of 67.989° (approximately 68°) and the surface of action to intersect over the entire face width without a change in the pitch cone $C_{p1}$, the ring gear addendum angle $\alpha_g$ may be increased so that the tip cone angle $\Gamma_f$ is 680. As shown in FIG. 20, by setting the gear addendum angle $\alpha_g$ to 5.216°, the tip cone angle $\Gamma_f=68°$ is realized and the above-described tooth trace contact ratio is achieved along the tooth tip. However, if the tooth is designed according to the standard expressions (31) and (32), almost no dedendum of the ring gear exists, and the pinion would consist mostly of the dedendum.

In this case, the pinion would have negative addendum modification, sufficient effective tooth surface cannot be formed, and the strength of the tooth of the pinion is reduced. Thus, such a configuration cannot be realized.

5.4 Hypoid Gear Specifications and Test Results when $\Gamma_{gw}$ is Set $\Gamma_{gw}=\Gamma_s=67.989°$ Table 2 shows hypoid gear specifications when $\Gamma_{gw}$ is set $\Gamma_{gw}=\Gamma_s=67.989°$. Compared to Table 1, identical ring gear reference circle radius $R_{2w}=89.255$ mm and pinion spiral angle $\psi_{pw}=46.988°$ are employed, and the ring gear pitch cone angle is changed from $\Gamma_{gw}=62.784°$ to 67.989°. As a result, $P_w$ and $\Gamma_{gw}$ differ as shown in FIG. 17 and, as will be described below, the other specifications are also different. The pitch cone of the gear is in contact with the pitch cone of the pinion at the reference point $P_w$.

Design reference point $P_w(9.607, 0.825, 96.835:C_s)$

Pinion cone radius $R_{1w}=45.449$ mm

Ring gear pitch cone angle $\Gamma_{gw}=67.989°$

Pinion pitch cone angle $\gamma_{pw}=21.214°$

Spiral angle on ring gear pitch plane $\psi_{gw}=30.768°$

Figure 16:
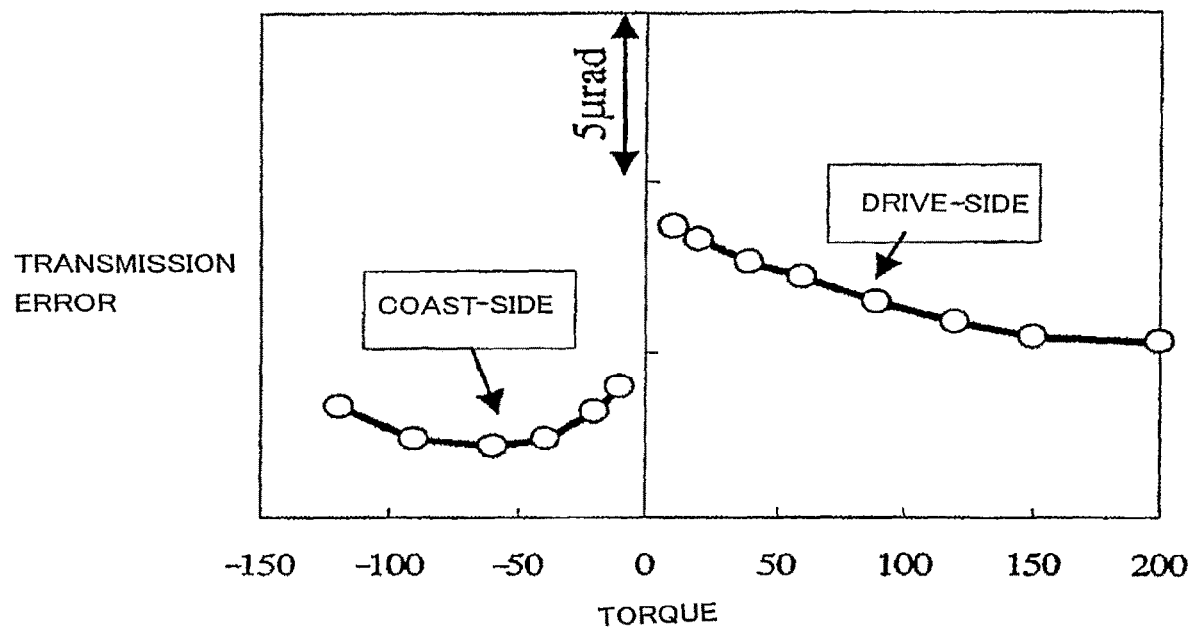
FIG. 16 is a diagram showing a transmission error of a hypoid gear manufactured as prototype that uses current design method.
Figure 21:
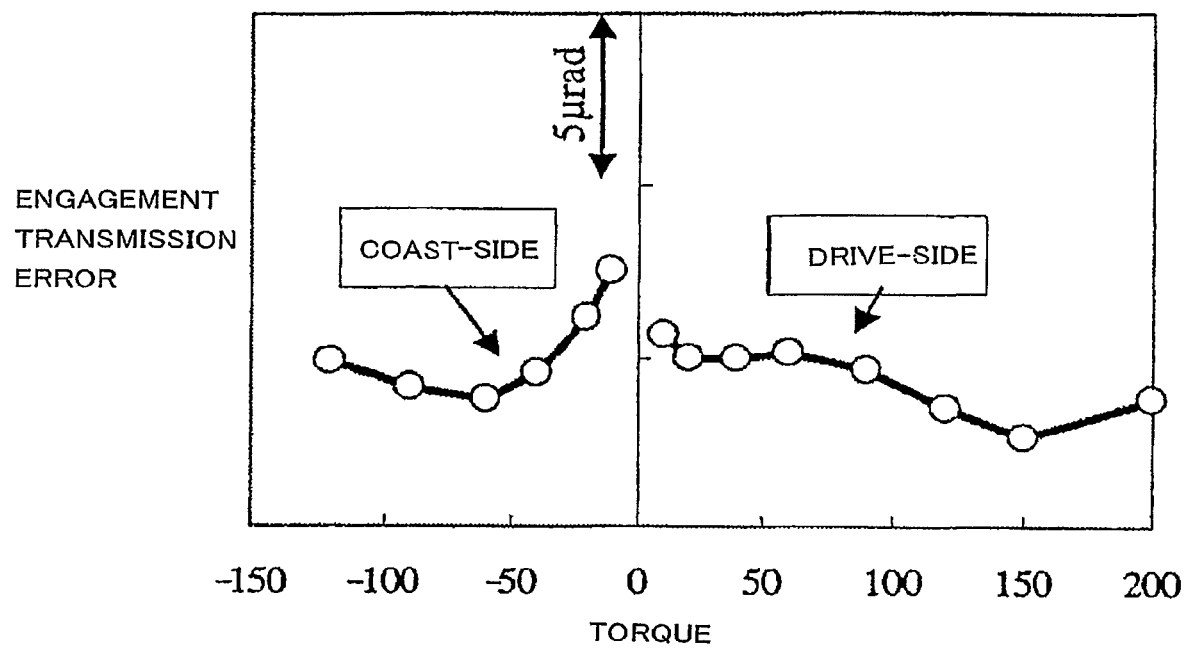
FIG. 21 is a diagram showing a transmission error of a hypoid gear manufactured as prototype using a design method of a preferred embodiment of the present invention.

With the pressure angles $\varphi_{nwD}$ and $\varphi_{nwC}$ identical to Table 1, if $g_{wD}(30.768°, 15°)$ and $g_{wC}(30.768°, -27.5°)$ are set, the inclination angles would differ, in the static coordinate system $C_s$, from $g_{wD}$ and $g_{wC}$ of Table 1:

$g_{wD}(\psi_{0D}=45.86°, \varphi_{n0D}=19.43°:C_s)$ $g_{wC}(\psi_{0C}=43.17°, \varphi_{n0C}=-22.99°:C_s)$ The inclination angles of $g_{wD}$ and $g_{wC}$ on the surface of action, and one pitch are:

$\varphi_{s0D}=26.86°, \psi_{sw0D}=42.59°, P_{gwD}=9.903$ $\varphi_{s0C}=-30.19°, \psi_{sw0C}=39.04°, P_{gwC}=9.094$ The tooth trace contact ratios are calculated in the following manner based on expressions (22), (23), and (24):

$P_{fwD}=14.63, F_{1wpD}=34.70, m_{fD}=2.371$      Drive-side:

$P_{fwC}=14.44, F_{1wpC}=34.70, m_{fC}=2.403$      Coast-side:

FIG. 21 shows a test result of the specifications of Table 2, and it can be seen that, based on a comparison with FIG. 16, the transmission error is approximately equal between the drive-side and the coast-side, corresponding to the tooth trace contact ratios.

5.5 Specifications of Hypoid Gear when $\beta_w=0$

Table 3 shows specifications of a hypoid gear when $\beta_w$ is set to 0 ($\beta_w=0$) in the method of determining the design reference point $P_w$ based on $R_{2w}$, $\beta_w$, and $\psi_{rw}$ described in section 4.2B.

6. Computer Aided Design System

Figure 22:
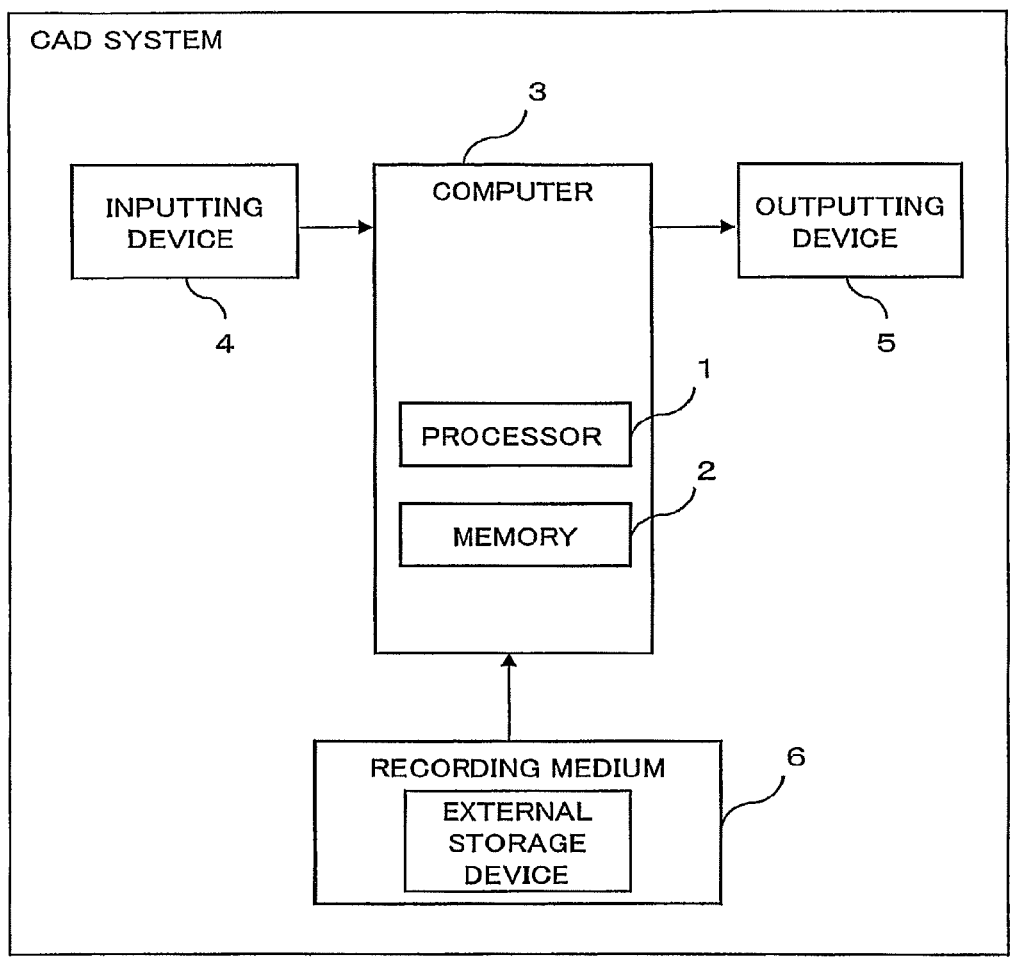
FIG. 22 is a schematic structural diagram of a system which aids a design method for a hypoid gear.

In the above-described design of hypoid gears, the design is aided by a computer aided system (CAD) shown in FIG. 22. The CAD system comprises a computer 3 having a processor 1 and a memory 2, an inputting device 4, an outputting device 5, and an external storage device 6. In the external storage device 6, data is read and written from and to a recording medium. On the recording medium, a gear design program for executing the design method of the hypoid gear as described above is recorded in advance, and the program is read from the recording medium as necessary and executed by the computer.

The program can be briefly described as follows. First, a design request value of the hypoid gear and values of variables for determining a tooth surface are acquired. A pitch cone angle $\Gamma_{gcone}$ of one gear is provisionally set and used along with the acquired values of the variables, and an contact ratio $m_{fconeD}$ of the drive-side tooth surface and an contact ratio $m_{fconeC}$ of the coast-side tooth surface based on the newly defined tooth trace as described above are calculated. The pitch cone angle $\Gamma_{gcone}$ is changed and the calculation is repeatedly executed so that these contact ratios become predetermined values. When the contact ratios of the tooth surfaces become predetermined values, the pitch cone angle at this point is set as a design value $\Gamma_{gw}$, and the specifications of the hypoid gear are calculated. The predetermined value of the contact ratio designates a certain range, and values in the range. Desirably, the range of the contact ratio is greater than or equal to 2.0. The range may be changed between the drive-side and the coast-side. The initial value of the pitch cone angle $\Gamma_{gcone}$ to be provisionally set is desirably set to the inclination angle $\Gamma_s$ of the instantaneous axis S.

Another program calculates the gear specifications by setting the pitch cone angle $\Gamma_{gw}$ to the inclination angle $\Gamma_s$ of the instantaneous axis from the first place, and does not re-adjust the pitch cone angle according to the contact ratio. Because it is known that the contact ratios of the tooth surfaces become approximately equal to each other when the pitch cone angle $\Gamma_{gw}$ is set to the inclination angle $\Gamma_s$, of the instantaneous axis, such a program is sufficient as a simple method.

Figure 23:
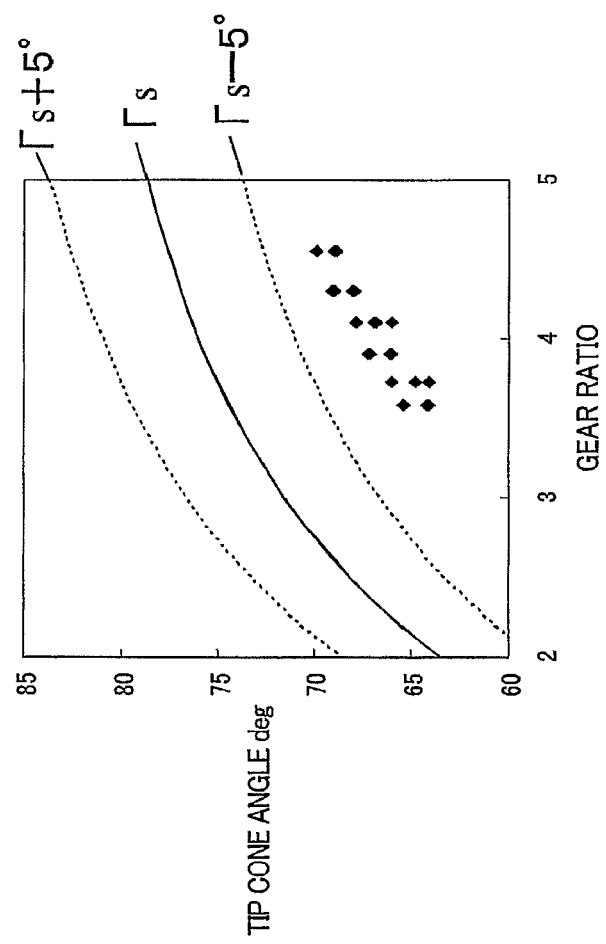
FIG. 23 is a diagram showing a relationship between a gear ratio and a tip cone angle of a uniform tooth depth hypoid gear designed using a current method.
Figure 25:
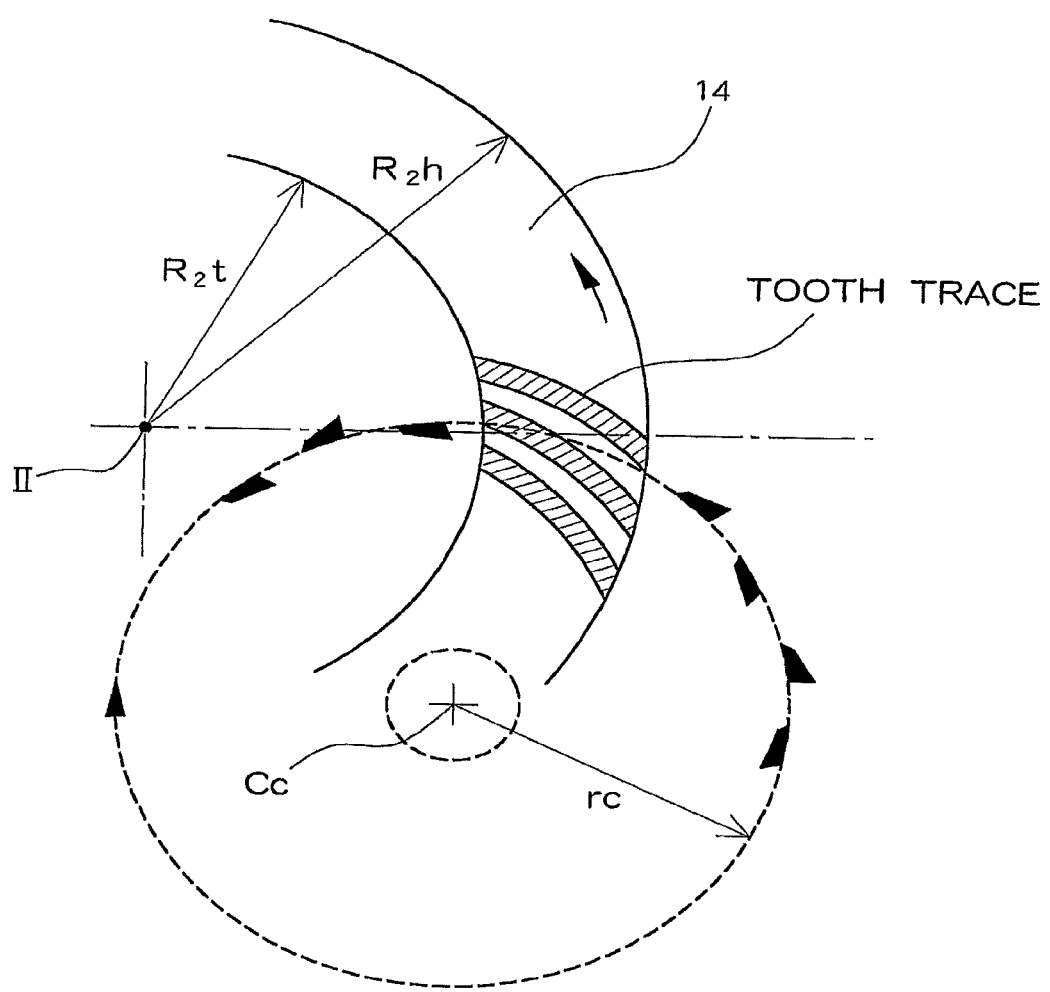
FIG. 25 is a diagram showing a relationship between a tooth trace curve and a cutter radius of a uniform-depth tooth.

FIG. 23 shows a gear ratio and a tip cone angle (face angle) $\Gamma_f$ of a uniform tooth depth in which a tooth depth is constant along a face width direction, manufactured through a face hobbing designed by the current method. The uniform tooth depth hypoid gear is a gear in which both the addendum angle $\alpha_g$ and the dedendum angle $\beta_g$ of FIG. 19 are 0°, and, consequently, the tip cone angle $\Gamma_f$ is equal to the pitch cone angle $\Gamma_{pw}$. The specifications of the tooth are determined by setting addendum and dedendum in the uniform tooth depth hypoid gear. In a uniform tooth depth hypoid gear, as shown in FIG. 25, while a cutter revolves around the center axis II of the ring gear 14, the cutter rotates with a cutter center cc as the center of rotation. With this motion, the edge of the cutter moves in an epicycloidal shape and the tooth trace curve is also in an epicycloidal shape. In hypoid gears having a ratio $r_c/D_{g0}$ between a cutter radius $r_c$ and an outer diameter $D_{g0}$ of less than or equal to 0.52, a ratio $E/D_{g0}$ between an offset E and the outer diameter $D_{g0}$ of greater than or equal to 0.111, and a gear ratio of greater than or equal to 2 and less than or equal to 5, as shown in FIG. 23, hypoid gears around the inclination angle $\Gamma_s$ of the instantaneous axis S are not designed. On the other hand, with the design method of the cone angle according to the present embedment, hypoid gears having the tip cone angle $\Gamma_f$ which is around $\Gamma_s$ can be designed.

Figure 24:
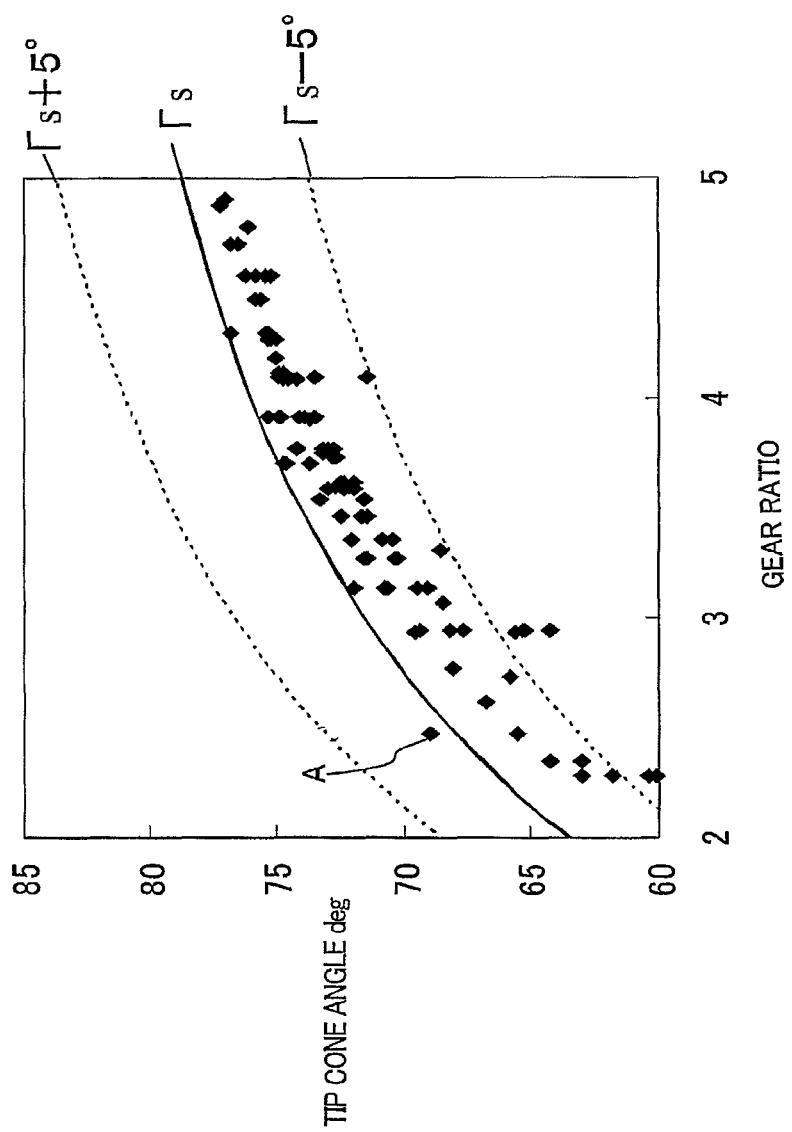
FIG. 24 is a diagram showing a relationship between a gear ratio and a tip cone angle of a tapered tooth depth hypoid gear designed using a current method.
Figure 26:
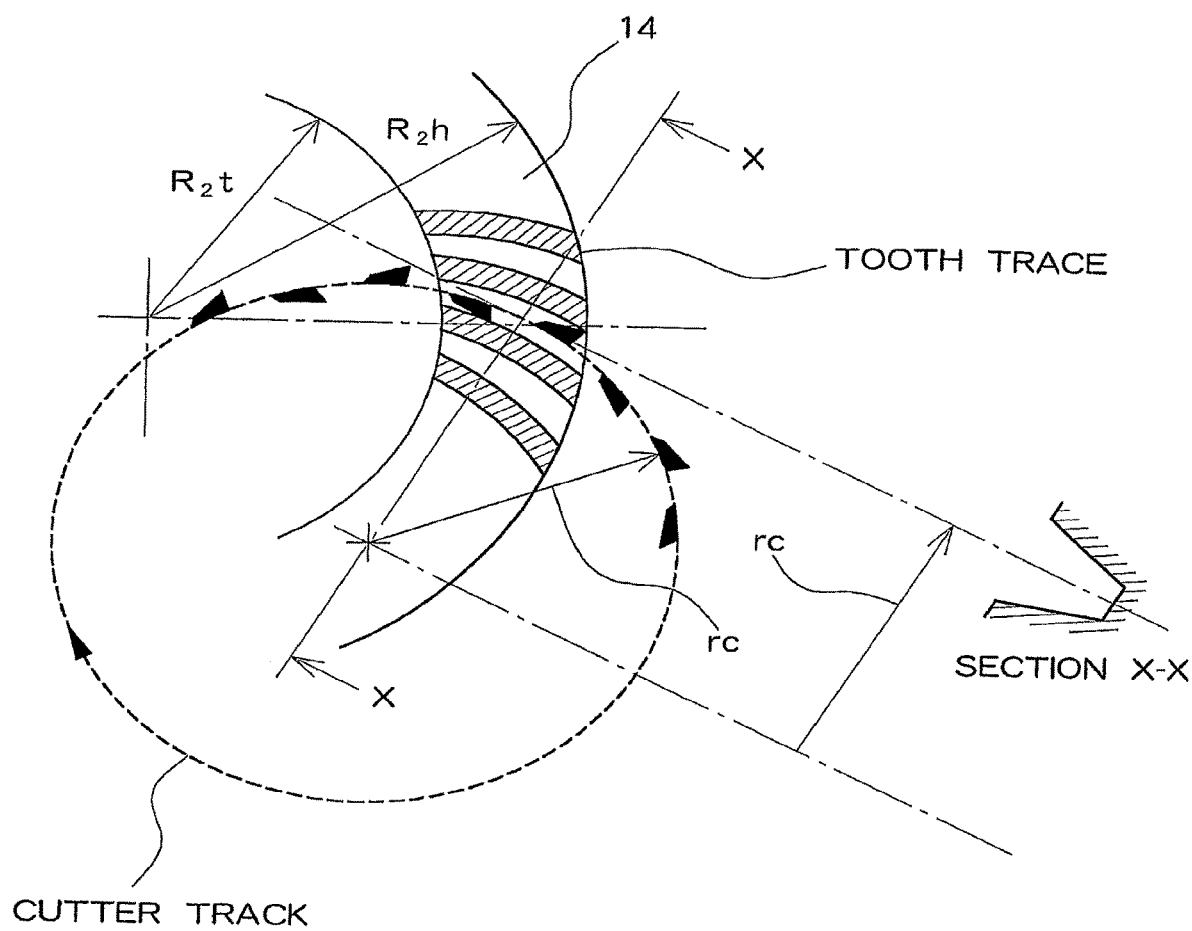
FIG. 26 is a diagram showing a relationship between a tooth trace curve and a cutter radius of a tapered-depth tooth.

FIG. 24 shows a gear ratio and a tip cone angle (face angle) $\Gamma_f$ of a tapered tooth depth gear in which a tooth depth changes along a face width direction, manufactured through a face milling designed by the current method. As shown in FIG. 19, the tip cone angle $\Gamma_f$ is a sum of the pitch cone angle $\Gamma_{gw}$ and the addendum angle $\alpha_g$, and is a value determined by a sum of the ring gear addendum angle and the ring gear dedendum angle, the ring gear addendum, and the pinion addendum, as shown in expression (31). In a tapered tooth depth hypoid gear, as shown in FIG. 26, a radius of curvature of the tooth trace of the ring gear 14 is equal to the cutter radius $r_c$. In hypoid gears having a ratio $r_c/D_{g0}$ between a cutter radius $r_c$ and an outer diameter $D_{g0}$ of less than or equal to 0.52, a ratio $E/D_{g0}$ between an offset E and the outer diameter $D_{g0}$ of greater than or equal to 0.111, and a gear ratio of greater than or equal to 2 and less than or equal to 5, as shown in FIG. 24, hypoid gears of greater than or equal to the inclination angle $\Gamma_s$ of the instantaneous axis S are not designed. On the other hand, the hypoid gear according to the present embedment has a tip cone angle of greater than or equal to $\Gamma_s$ although the variables are within the above-described range, as shown with reference "A" in FIG. 24. Therefore, specifications that depart from the current method are designed.

TABLE 1

|  | PINION | RING GEAR |
|---|---|---|
| SHAFT ANGLE Σ | 90° | |
| OFFSET E | 28 | |
| NUMBER OF TEETH N1, N2 | 19 | 47 |
| INCLINATION ANGLE $\Gamma_s$ OF INSTANTANEOUS AXIS | 67.989° | |
| CUTTER RADIUS $R_c$ (RADIUS OF CURVATURE OF GEAR TOOTH TRACE) | 3.75" | |

TABLE 1-continued

|  | PINION | RING GEAR |
|---|---|---|
| REFERENCE CIRCLE RADIUS R 1w, R 2w | 45.406 | 89.255 |
| PITCH CONE ANGLE γ pw, Γ gw | 26.291° | 62.784° |
| SPIRAL ANGLE ON PITCH PLANE φ pw, φ gw | 46.988° | 30.858° |
| TIP CONE ANGLE | 30.728° | 63.713° |
| INTERNAL AND EXTERNAL RADII OF GEAR (FACE WIDTH) R 2t, R 2h (Fq) | | 73.9, 105, (35) |
| GEAR ADDENDUM | | 1.22 |
| GEAR DEDENDUM | | 6.83 |
| GEAR WORKING DEPTH | | 7.15 |

| CONTACT RATIO (GLEASON METHOD) | DRIVE-SIDE | COAST-SIDE |
|---|---|---|
| PRESSURE ANGLE φ nw | 15° | −27.5° |
| TRANSVERSE CONTACT RATIO | 1.13 | 0.78 |
| TRACE CONTACT RATIO (NEW CALCULATION METHOD mfcone) | 2.45 (1.70) | 2.45 (2.92) |

TABLE 2

|  | PINION | RING GEAR |
|---|---|---|
| SHAFT ANGLE Σ | 90° | |
| OFFSET E | 28 | |
| NUMBER OF TEETH N1, N2 | 19 | 47 |
| INCLINATION ANGLE $\Gamma_s$ OF INSTANTANEOUS AXIS | 67.989° | |
| CUTTER RADIUS $R_c$ (RADIUS OF CURVATURE OF GEAR TOOTH TRACE) | ARBITRARY | |
| REFERENCE CIRCLE RADIUS R 1w, R 2w | 45.449 | 89.255 |
| PITCH CONE ANGLE γ pw, Γ gw | 21.214° | 67.989° |
| SPIRAL ANGLE ON PITCH PLANE φ pw, φ gw | 46.988° | 30.768° |
| TIP CONE ANGLE | 25.267° | 68.850° |
| INTERNAL AND EXTERNAL RADII OF GEAR R 2t, R 2h | | 73.9, 105 |
| GEAR ADDENDUM | | 1.22 |
| GEAR DEDENDUM | | 6.83 |
| GEAR WORKING DEPTH | | 7.15 |

| CONTACT RATIO (NEW CALCULATION METHOD) | DRIVE-SIDE | COAST-SIDE |
|---|---|---|
| PRESSURE ANGLE φ nw | 15° | −27.5° |
| TRANSVERSE CONTACT RATIO ms | 1.05 | 0.85 |
| TOOTH TRACE CONTACT RATIO mf | 2.37 | 2.40 |

TABLE 3

|  | PINION | RING GEAR |
|---|---|---|
| SHAFT ANGLE Σ | 90° | |
| OFFSET E | 28 | |
| NUMBER OF TEETH N1, N2 | 19 | 47 |
| INCLINATION ANGLE $\Gamma_s$ OF INSTANTANEOUS AXIS | 67.989° | |
| CUTTER RADIUS $R_c$ (RADIUS OF CURVATURE OF GEAR TOOTH TRACE) | ARBITRARY | |
| DESIGN REFERENCE POINT $P_w$ | (9.73, 0, 96.64) | |
| REFERENCE CIRCLE RADIUS $R_{1w}, R_{2w}$ | 45.41 | 89.255 |
| PITCH CONE ANGLE $\gamma_{pw}, \Gamma_{gw}$ | 22° | 68° |
| SPIRAL ANGLE $\psi_{rw} = \psi_0$ | 45° | |
| TIP CONE ANGLE | 22° | 68° |
| INTERNAL AND EXTERNAL RADII OF GEAR (FACE WIDTH) $R_{2t}, R_{2h}$ | | 73.9, 105 |

TABLE 3-continued

| | | |
|---|---|---|
| GEAR ADDENDUM | | 1.22 |
| GEAR DEDENDUM | | 6.83 |
| GEAR WORKING TOOTH DEPTH | | 7.15 |
| CONTACT RATIO (NEW CALCULATION METHOD) | DRIVE-SIDE | COAST-SIDE |
| PRESSURE ANGLE $\varphi_{nOD}$, $\varphi_{nOC}$ | 18° | −20° |
| TRANSVERSE CONTACT RATIO $m_s$ | 1.34 | 0.63 |
| TOOTH TRACE CONTACT RATIO $m_f$ | 2.43 | 2.64 |

The invention claimed is:

1. A hypoid gear comprising a pair of gears including a first gear and a second gear, wherein
the hypoid gear is a spiral hypoid gear, and
a tip cone angle ($\Gamma_f$) of the second gear is set at a value which is greater than or equal to an inclination angle ($\Gamma_s$), of an instantaneous axis (S) which is an axis of a relative angular velocity of the first gear and the second gear with respect to a rotational axis of the second gear, and less than or equal to the inclination angle ($\Gamma_s$) plus five degrees ($\Gamma_s$)+5°).

2. A hypoid gear according to claim 1, wherein
a ratio ($r_c/D_{go}$) between a radius of curvature ($r_c$) of a tooth trace of the second gear and an outer diameter ($D_{go}$) is less than or equal to 0.52, the outer diameter ($D_{go}$) being an outer diameter of the second gear at an outermost edge of the second gear.

3. A hypoid gear according to claim 2, wherein
a ratio ($E/D_{go}$) between an offset (E) and the outer diameter ($D_{go}$) is greater than or equal to 0.111, the offset (E) being a distance between a rotational axis of the first gear and the rotational axis of the second gear.

4. A hypoid gear according to claim 1, wherein
a gear ratio is greater than or equal to 2 and less than or equal to 5.

* * * * *

UNITED STATES PATENT AND TRADEMARK OFFICE
CERTIFICATE OF CORRECTION

PATENT NO. : 10,578,192 B2
APPLICATION NO. : 15/980464
DATED : March 3, 2020
INVENTOR(S) : Mizuho Inagaki et al.

It is certified that error appears in the above-identified patent and that said Letters Patent is hereby corrected as shown below:

In the Claims

In Column 36, Line 4, in Claim 1, delete "(Γs) + 5)°.", and insert -- ((Γs) + 5)°. --, therefor.

Signed and Sealed this
Nineteenth Day of May, 2020

Andrei Iancu
*Director of the United States Patent and Trademark Office*